(12) United States Patent
Saito et al.

(10) Patent No.: US 8,217,130 B2
(45) Date of Patent: *Jul. 10, 2012

(54) CURABLE COMPOSITION AND METHOD FOR PRODUCING THE SAME

(75) Inventors: Atsushi Saito, Tokyo (JP); Tomonori Saito, Tokyo (JP); Naomi Okamura, Tokyo (JP)

(73) Assignee: Cemedine Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/823,581

(22) Filed: Jun. 25, 2010

(65) Prior Publication Data

US 2010/0267898 A1    Oct. 21, 2010

Related U.S. Application Data

(63) Continuation of application No. 10/566,477, filed as application No. PCT/JP2004/010909 on Jul. 30, 2004, now Pat. No. 7,781,559.

(30) Foreign Application Priority Data

Aug. 1, 2003  (JP) ................................. 2003-285322
Sep. 3, 2003  (JP) ................................. 2003-311808

(51) Int. Cl.
*C08G 77/20*    (2006.01)

(52) U.S. Cl. ................ 528/32; 528/10; 528/33; 528/34; 526/72; 526/222; 526/279; 526/943; 525/100; 525/341; 525/474; 525/477; 525/479; 507/119; 507/121; 507/127; 524/588; 522/99; 522/111; 522/118; 522/134

(58) Field of Classification Search ............... 525/50, 525/55, 100, 106, 191, 192, 326.1, 329.7, 525/330.3, 341, 342, 343, 344, 374.477, 525/478, 479; 528/10, 15, 29, 31, 32, 33, 528/34; 524/588; 522/99, 100, 111, 118, 522/122, 134, 143, 148, 172; 526/170, 171, 526/222, 279, 344, 943; 507/119, 121, 903

See application file for complete search history.

(56) References Cited

U.S. PATENT DOCUMENTS 4,721,766 A * 1/1988 Inoue et al. ..................... 528/18
6,407,146 B1 * 6/2002 Fujita et al. ..................... 522/99

FOREIGN PATENT DOCUMENTS

JP    2001040037    *  2/2001

OTHER PUBLICATIONS

Machine translation of JP 2001/040037.*
Translation of JP 2001-040037, Okamoto et al.*

* cited by examiner

*Primary Examiner* — James J Seidleck
*Assistant Examiner* — Frances Tischler
(74) *Attorney, Agent, or Firm* — McGlew and Tuttle, P.C.

(57) ABSTRACT

Disclosed herein is a curable composition excellent in workability, adhesion properties, rubber-like properties, storage stability, and quick curability. The curable composition comprises (A) a crosslinkable silyl group-containing organic polymer and (B) a (meth)acrylic polymer obtained by polymerizing a (meth)acrylic monomer having a polymerizable unsaturated bond in the presence of a metallocene compound and a crosslinkable silyl group-containing thiol compound, at least one end of the (meth)acrylic polymer being bonded to a residue, —S—$R^3$ (where $R^3$ represents a group having a crosslinkable silyl group) obtained by removing a hydrogen atom from the crosslinkable silyl group-containing thiol compound.

11 Claims, 1 Drawing Sheet

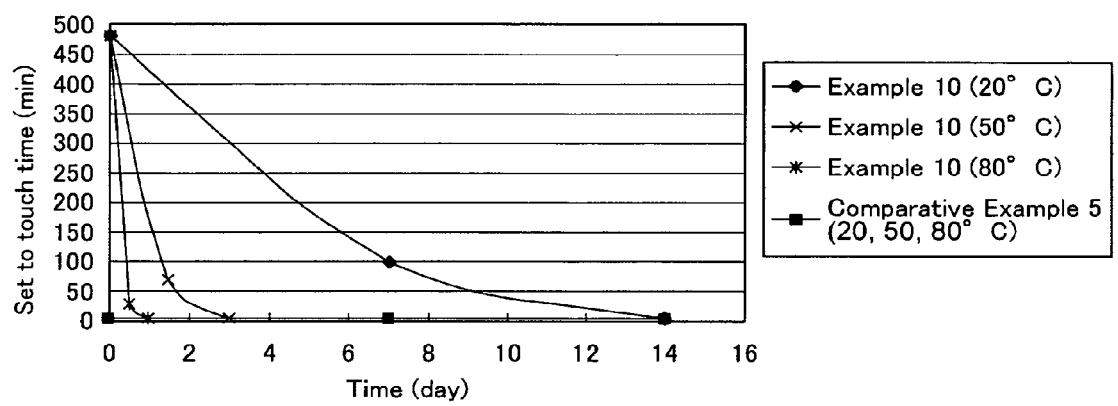

CURABLE COMPOSITION AND METHOD FOR PRODUCING THE SAME

CROSS REFERENCE TO RELATED APPLICATIONS

This is a continuation under 37 CFR 1.53(b) of prior application Ser. No. 10/566,477 filed Jan. 31, 2006, which is now U.S. Pat. No. 7,781,559 and is a United States National Phase Application of International Application PCT/JP04/10909 filed Jul. 30, 2004 and claims the benefit of priority under 35 U.S.C. §119 of Japanese Patent Application JP 2003285322 filed Aug. 1, 2003 and Japanese Patent Application JP 2003311808 filed Sep. 3, 2003, the entire contents of each of the applications are incorporated herein by reference.

TECHNICAL FIELD

The present invention relates to a curable composition, more particularly to a curable composition excellent in adhesion properties, rubber-like properties, quick curability, and production stability.

BACKGROUND ART

An acrylic polymer obtained by polymerization using a special polymerization catalyst is disclosed in Patent Document 1. Patent Document 1 also discloses a curable composition composed of such a special acrylic polymer and a silane coupling agent. However, the curable composition is still poor in, for example, adhesion properties and rubber-like properties.

On the other hand, room temperature-curable compositions containing crosslinkable silyl group-containing organic polymers have already been industrially produced, and have been widely used for sealants, adhesives, coating materials, and the like. In general, these curable compositions contain various metal catalysts so as to have curability. The kind of metal catalyst to be used and the amount thereof to be added are varied depending on the purpose of use of the curable compositions.

As such catalysts, reaction products of organotin compounds with ester compounds have been conventionally known (see, for example, Patent Documents 2-5). Particularly, catalysts obtained by using phthalate esters as the ester compounds have been generally used. However, the phthalate esters are volatile organic compounds (VOC) whose guideline values have been specified by Ministry of Health, Labor and Welfare, and the use of the phthalate esters is being perceived as a problem. In recent years, it is therefore desired that catalysts be designed without using the phthalate esters.

Meanwhile, there have been high market demands for quickly-curable products, but such quickly-curable products have a disadvantage that they are cured in course of production. For example, Patent Document 5 discloses an organic polymer containing a crosslinkable silyl group represented by —$SiX_3$ and a curable composition containing a reaction product of dialkyltinoxide with an ester-based compound. However, such a curable composition has caused a problem that products are cured in course of production due to its high reactivity. In a case where an organotin compound-based curing catalyst having a relatively low reactivity is used in view of production stability, quick curability cannot be attained. On the other hand, in a case where an organotin compound-based curing catalyst having a relatively high reactivity is used in view of quick curability, production stability cannot be attained as is the case with the product containing a reaction product of dialkyltinoxide with an ester-based compound.

Recently, equipment which can produce catalysts in a completely enclosed system has been developed, and is being well received by manufacturers of room temperature-curable products. However, introduction of such equipment involves some problems that there is a limit to the number of additives and the equipment is very expensive. Under the circumstances, the present inventors have intensively investigated an organotin compound-based curing catalyst which can exhibit high activity after a certain length of time has elapsed, which has led to the completion of the present invention.

Patent Document 1: Japanese Patent Application Laid-Open No. 2001-40037
Patent Document 2: Examined Japanese Patent Application Publication No. 1-58219
Patent Document 3: Japanese Patent No. 3062625
Patent Document 4: Japanese Patent Application Laid-Open No. 8-337713
Patent Document 5: Japanese Patent Application Laid-Open No. 2003-138151
Patent Document 6: Japanese Patent Application Laid-Open No. 11-12480
Patent Document 7: Japanese Patent Application Laid-Open No. 52-73998
Patent Document 8: Japanese Patent Application Laid-Open No. 55-9669
Patent Document 9: Japanese Patent Application Laid-Open No. 59-122541
Patent Document 10: Japanese Patent Application Laid-Open No. 60-6747
Patent Document 11: Japanese Patent Application Laid-Open No. 61-233043
Patent Document 12: Japanese Patent Application Laid-Open No. 63-112642
Patent Document 13: Japanese Patent Application Laid-Open No. 3-79627
Patent Document 14: Japanese Patent Application Laid-Open No. 4-283259
Patent Document 15: Japanese Patent Application Laid-Open No. 5-70531
Patent Document 16: Japanese Patent Application Laid-Open No. 5-287186
Patent Document 17: Japanese Patent Application Laid-Open No. 11-80571
Patent Document 18: Japanese Patent Application Laid-Open No. 11-116763
Patent Document 19: Japanese Patent Application Laid-Open No. 11-130931
Patent Document 20: Japanese Patent No. 3313360

DISCLOSURE OF THE INVENTION

Problems to be Solved by the Invention

In view of the problems associated with prior art, it is one object of the present invention to provide a curable composition excellent in workability, adhesion properties, rubber-like properties, and storage stability. Further, it is another object of the present invention to provide a curable composition excellent in quick curability, production stability, product stability, and adhesion properties without using a phthalate ester.

Means for Solving the Problems

In order to solve the above problems, a first aspect of the present invention is directed to a curable composition including:

(A) a crosslinkable silyl group-containing organic polymer; and (B) a (meth)acrylic polymer obtained by polymerizing a (meth)acrylic monomer having a polymerizable unsaturated bond in the presence of a metallocene compound represented by the following formula (1) and a crosslinkable silyl group-containing thiol compound, at least one end of the (meth)acrylic polymer being bonded to a residue, —S—$R^3$ (where $R^3$ represents a group having a crosslinkable silyl group) obtained by removing a hydrogen atom from the crosslinkable silyl group-containing thiol compound. It is to be noted that in this specification, the term "(meth)acrylic" includes both acrylic and methacrylic.

[Formula 1]

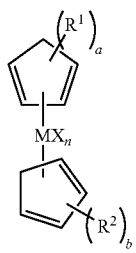

(1)

(where M represents a metal selected from the group consisting of metals of Groups 4, 5, and 14 of the periodic table, chromium, ruthenium, and palladium; $R^1$ and $R^2$ each independently represent at least one group selected from the group consisting of substituted or unsubstituted aliphatic hydrocarbon groups, substituted or unsubstituted alicyclic hydrocarbon groups, substituted or unsubstituted aromatic hydrocarbon groups, and substituted or unsubstituted silicon-containing groups, a hydrogen atom or a single bond, provided that $R^1$ and $R^2$ may cooperate with each other to bond the two five-membered rings of the compound represented by the formula (1) and provided that the plurality of adjacent groups $R^1$ or $R^2$ may cooperate with each other to form a cyclic structure; a and b each independently represent an integer of 1 to 4; Y represents a halogen atom or a hydrocarbon group in which at least part of hydrogen atoms may be substituted with a halogen atom; and n is 0 or an integer obtained by subtracting 2 from the valence of the metal M.)

In the present invention, it is preferred that the main chain of the (meth)acrylic polymer (B) contain a repeating unit represented by the following formula (2) in an amount of 99% by weight or less, and further contain as a repeating unit other than the repeating unit represented by the formula (2), a repeating unit derived from a polymerizable unsaturated compound monomer having one or more crosslinkable silyl groups in the molecule, in an amount of 1 to 50% by weight:

[Formula 2]

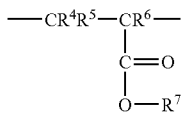

(2)

(where $R^4$ to $R^6$ each independently represent a hydrogen atom, a halogen atom or an alkyl group having 1 to 3 carbon atoms, and $R^7$ represents a hydrogen atom, an alkali metal atom or a hydrocarbon group having 1 to 22 carbon atoms (the hydrocarbon group may be linear or may have a side chain; at least part of hydrogen atoms of the hydrocarbon group or of a group constituting the side chain of the hydrocarbon group may be substituted with at least one polar group or reactive functional group selected from the group consisting of a chlorine atom, a fluorine atom, a primary amino group, a secondary amino group, a tertiary amino group, a quaternary amine salt group, an amido group, an isocyanate group, an alkylene oxide group, a hydroxysilyl group, a methoxysilyl group, an ethoxysilyl group, a propoxysilyl group, a chlorosilyl group, a buromosilyl group, and a glycidyl group; the hydrocarbon group may have a double bond; and the hydrocarbon group may have a cyclic structure).)

Further, it is also preferred that the crosslinkable silyl group of the (meth)acrylic polymer (B) be represented by the following general formula (3):

[Formula 3]

—$SiX_3$ (3)

(where X represents a hydroxyl or hydrolyzable group and three Xs may be the same or different.)

Furthermore, it is also preferred that the (meth)acrylic polymer (B) contain both of a crosslinkable silyl group represented by the following general formula (3) and a crosslinkable silyl group represented by the following general formula (4):

[Formula 3]

(3)

[Formula 4]

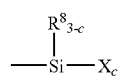

(4)

(where X represents a hydroxyl or hydrolyzable group; when the plurality of Xs exist, they may be the same or different; $R^8$ represents a substituted or unsubstituted monovalent organic group having 1 to 20 carbon atoms; when the plurality of $R^8$s exist, they may be the same or different; and c is 1 or 2.)

Moreover, it is also preferred that the (meth)acrylic polymer (B) be a mixture of a (meth)acrylic polymer containing a crosslinkable silyl group represented by the following general formula (3) and a (meth)acrylic polymer containing a crosslinkable silyl group represented by the following general formula (4):

[Formula 3]

(3)

[Formula 4]

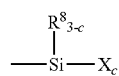

(4)

(where X represents a hydroxyl or hydrolyzable group; when the plurality of Xs exist, they may be the same or different; $R^8$ represents a substituted or unsubstituted monovalent organic group having 1 to 20 carbon atoms; when the plurality of $R^8$s exist, they may be the same or different; and c is 1 or 2.)

In the first aspect of the present invention, it is preferred that the curable composition further contains a curing catalyst (C). In this case, the curing catalyst (C) preferably contains an organotin compound (C1) represented by the following general formula (5):

[Formula 5]

$$R^9R^{10}SnO \qquad (5)$$

(where $R^9$ and $R^{10}$ each represent a monovalent hydrocarbon group.)

In the first aspect of the present invention, in a case where the curable composition contains the organotin compound (C1) as a curing catalyst, the curable composition containing the components (A), (B) and (C1) is preferably subjected to reaction treatment.

A second aspect of the present invention is directed to a curable composition including:

(A) a crosslinkable silyl group-containing organic polymer; and (C1) an organotin compound represented by the following general formula (5):

[Formula 5]

$$R^9R^{10}SnO \qquad (5)$$

(where $R^9$ and $R^{10}$ each represent a monovalent hydrocarbon group.)

In the second aspect of the present invention, the curable composition containing the components (A) and (C1) is preferably subjected to reaction treatment.

In the first and second aspects of the present invention, the polymer (A) of the curable composition is preferably an organic polymer containing a crosslinkable silyl group represented by the following general formula (3):

[Formula 3]

$$-SiX_3 \qquad (3)$$

(where X represents a hydroxyl or hydrolyzable group and three Xs may be the same or different.)

In the first and second aspects of the present invention, the polymer (A) of the curable composition is preferably an organic polymer containing both of a crosslinkable silyl group represented by the following general formula (3) and a crosslinkable silyl group represented by the following general formula (4):

[Formula 3]

$$-SiX_3 \qquad (3)$$

[Formula 4]

$$\begin{array}{c} R^8{}_{3-c} \\ | \\ -Si-X_c \end{array} \qquad (4)$$

(where X represents a hydroxyl or hydrolyzable group; when the plurality of Xs exist, they may be the same or different; $R^8$ represents a substituted or unsubstituted monovalent organic group having 1 to 20 carbon atoms; when the plurality of $R^8$s exist, they may be the same or different; and c is 1 or 2.

In the first and second aspects of the present invention, the polymer (A) of the curable composition is preferably a mixture of an organic polymer containing a crosslinkable silyl group represented by the following general formula (3) and an organic polymer containing a crosslinkable silyl group represented by the following general formula (4):

[Formula 3]

$$-SiX_3 \qquad (3)$$

[Formula 4]

$$\begin{array}{c} R^8{}_{3-c} \\ | \\ -Si-X_c \end{array} \qquad (4)$$

(where X represents a hydroxyl or hydrolyzable group; when the plurality of Xs exist, they may be the same or different; $R^8$ represents a substituted or unsubstituted monovalent organic group having 1 to 20 carbon atoms; when the plurality of $R^8$s exist, they may be the same or different; and c is 1 or 2.)

In the first and second aspects of the present invention, the polymer (A) of the curable composition is preferably at least one selected from the group consisting of a crosslinkable silyl group-containing polyoxyalkylene-based polymer, a crosslinkable silyl group-containing (meth)acrylic-modified polyoxyalkylene-based polymer, a crosslinkable silyl group-containing polyisobutylene-based polymer, and a crosslinkable silyl group-containing (meth)acrylic polymer.

In the first and second aspects of the present invention, it is preferred that the curable composition further comprise a silane coupling agent (D).

The present invention is also directed to a method for producing a curable composition including at least the polymer (A) and the organotin compound (C1), the method including subjecting the curable composition packed in a hermetically sealed container to reaction treatment.

Effect of the Invention

According to the present invention, it is possible to provide a curable composition excellent in workability, adhesion properties, rubber-like properties, storage stability, deep-part curability, and quick curability. Further, according to the present invention, it is also possible to provide a curable composition which is highly safe because no phthalate ester is used, and is excellent in quick curability, production stability, product stability, and adhesion properties.

BRIEF DESCRIPTION OF THE DRAWINGS

FIG. 1 is a graph which shows measurement results of the set to touch time of each of the curable compositions of Example 10 and Comparative Example 5.

BEST MODE FOR CARRYING OUT THE INVENTION

Hereinbelow, embodiments of the present invention will be described, but these embodiments are illustrative only and it goes without saying that various modifications can be made without departing from the spirit of the present invention.

A first aspect of the present invention is directed to a curable composition comprising:

(A) a crosslinkable silyl group-containing organic polymer; and (B) a (meth)acrylic polymer obtained by polymerizing a (meth)acrylic monomer having a polymerizable unsaturated bond in the presence of a metallocene compound represented by the following formula (1) and a crosslinkable silyl group-containing thiol compound, at least one end of the (meth) acrylic polymer being bonded to a residue, —S—$R^3$ (where $R^3$ represents a group having a crosslinkable silyl group) obtained by removing a hydrogen atom from the crosslinkable silyl group-containing thiol compound:

[Formula 1]

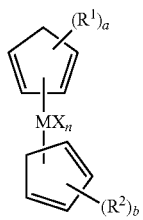

(1)

(M represents a metal selected from the group consisting of metals of Groups 4, 5, and 14 of the periodic table, chromium, ruthenium, and palladium; $R^1$ and $R^2$ each independently represent at least one group selected from the group consisting of substituted or unsubstituted aliphatic hydrocarbon groups, substituted or unsubstituted alicyclic hydrocarbon groups, substituted or unsubstituted aromatic hydrocarbon groups, and substituted or unsubstituted silicon-containing groups, a hydrogen atom or a single bond, provided that $R^1$ and $R^2$ may cooperate with each other to bond the two five-membered rings of the compound represented by the formula (1) and provided that the plurality of adjacent groups $R^1$ or $R^2$ may cooperate with each other to form a cyclic structure; a and b each independently represent an integer of 1 to 4; Y represents a halogen atom or a hydrocarbon group in which at least part of hydrogen atoms may be substituted with a halogen atom; and n is 0 or an integer obtained by subtracting 2 from the valence of the metal M.)

As the component (A) described above, an organic polymer containing a silicon-containing group which has a hydroxyl or hydrolyzable group bonded to a silicon atom and can be crosslinked by forming a siloxane bond, that is, an organic polymer containing a crosslinkable silyl group can be used. Examples of such a crosslinkable silyl group-containing organic polymer (A) include those disclosed in Patent Documents 2-20. Specific examples of the crosslinkable silyl group-containing organic polymer (A) include polyoxyalkylene-based, vinyl-modified polyoxyalkylene-based, (meth)acrylic-modified polyoxyalkylene-based, vinyl-based, polyester-based, and (meth)acrylic ester polymers which contain one or more crosslinkable silyl groups in the molecule and may contain organosiloxane in the main chain, copolymers thereof, and mixtures thereof.

The number of crosslinkable silyl groups is not particularly limited, but one to six crosslinkable silyl groups are generally contained in the molecule from the viewpoint of curing properties of a resultant curable composition and physical properties of the cured curable composition. From the viewpoint of ease of crosslinking and ease of production, a crosslinkable silyl group represented by the following general formula (6) is preferably used:

[Formula 6]

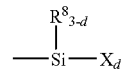

(6)

(where $R^8$ represents a substituted or unsubstituted monovalent organic group having 1 to 20 carbon atoms, preferably an alkyl group having 1 to 20 carbon atoms, an aryl group having 6 to 20 carbon atoms or an aralkyl group having 7 to 20 carbon atoms, most preferably a methyl group; when the plurality of $R^8$s exist, they may be the same or different; X represents a hydroxyl or hydrolyzable group, preferably a group selected from the group consisting of a halogen atom, a hydrogen atom, a hydroxyl group, an alkoxy group, an acyloxy group, a ketoxymate group, an amido group, an acid amide group, a mercapto group, an alkenyloxy group, and an aminooxy group, more preferably an alkoxy group, most preferably a methoxy group; when the plurality of Xs exist, they may be the same or different; and d is 1, 2 or 3, most preferably 3 from the viewpoint of quick curability.)

In a case where the crosslinkable silyl group-containing organic compound (A) contains a plurality of crosslinkable silyl groups, the crosslinkable silyl groups may be the same or different, and the values of "d" of the crosslinkable silyl groups represented by the formula (6) may be the same or different. For example, an organic polymer containing a crosslinkable silyl group represented by the following formula (3) and a crosslinkable silyl group represented by the following formula (4) can be used. Further, a mixture of an organic polymer containing a crosslinkable silyl group represented by the following formula (3) and an organic polymer containing a crosslinkable silyl group represented by the following formula (4) can also be preferably used.

[Formula 3]

(3)

[Formula 4]

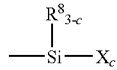

(4)

(X and $R^8$ are the same as those described above with reference to the formula (6), and c is 1 or 2.)

From the viewpoint of physical properties of the cured curable composition, such as tensile adhesion properties and modulus, the main chain of the crosslinkable silyl group-containing organic polymer (A) is preferably a polyoxyalkylene-based polymer, a (meth)acrylic-modified polyoxyalkylene polymer, a polyisobutylene-based polymer, a (meth) acrylic polymer or a copolymer thereof, and may contain organosiloxane.

Particularly, the crosslinkable silyl group-containing organic polymer is preferably at least one polymer selected from crosslinkable silyl group-containing polyoxyalkylene-based polymers and crosslinkable silyl group-containing (meth)acrylic-modified polyoxyalkylene-based polymers. The number average molecular weight of the crosslinkable silyl group-containing organic polymer (A) is in the range of 1,000 to 100,000, preferably in the range of 3,000 to 50,000. The molecular weight distribution is preferably narrow because the uncured curable composition is easy to handle due to its low viscosity and the cured curable composition can have desirable physical properties such as strength, elongation, and modulus. The crosslinkable silyl group-containing organic polymers (A) can be used singly or in combination of two or more of them.

As the compound (B), a (meth)acrylic polymer disclosed in Patent Document 1 is used. Specifically, the compound (B), that is, the (meth)acrylic polymer is a polymer obtained by polymerizing a polymerizable unsaturated compound in the presence of catalysts, a metallocene compound represented by the following formula (1) and a crosslinkable silyl group-containing thiol compound. At least one end of the polymer is bonded to a residue (—S—$R^3$) obtained by removing a hydrogen atom from the crosslinkable silyl group-containing thiol compound used as a catalyst. Here, $R^3$ represents a group having a crosslinkable silyl group.

The metallocene compound to be used as a polymerization catalyst can be represented by the following formula (1):

[Formula 1]

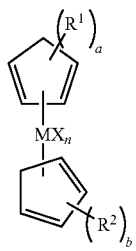

(1)

In the formula (1), M represents a metal selected from the group consisting of metals of Groups 4, 5, and 14 of the periodic table, chromium, ruthenium, and palladium; specific examples of M include titanium, zirconium, chromium, ruthenium, vanadium, palladium, and tin; $R^1$ and $R^2$ each independently represent at least one group selected from the group consisting of substituted or unsubstituted aliphatic hydrocarbon groups, substituted or unsubstituted alicyclic hydrocarbon groups, substituted or unsubstituted aromatic hydrocarbon groups, and substituted or unsubstituted silicon-containing groups, a hydrogen atom or a single bond.

$R^1$ and $R^2$ may cooperate with each other to bond the two five-membered rings of the compound represented by the formula (1) and the plurality of adjacent groups $R^1$ or $R^2$ may cooperate with each other to form a cyclic structure; a and b each independently represent an integer of 1 to 4; Y represents a halogen atom or a hydrocarbon group in which at least part of hydrogen atoms may be substituted with a halogen atom; and n is 0 or an integer obtained by subtracting 2 from the valence of the metal M.

Specific examples of the metallocene compound include: titanocene compounds such as dicyclopentadiene-Ti-dichloride, dicyclopentadiene-Ti-bisphenyl, dicyclopentadiene-Ti-bis-2,3,4,5,6-pentafluorophen-1-yl, dicyclopentadiene-Ti-bis-2,3,5,6-tetrafluorophen-1-yl, dicyclopentadiene-Ti-bis-2,5,6-trifluorophen-1-yl, dicyclopentadiene-Ti-bis-2,6-difluorophen-1-yl, dicyclopentadiene-Ti-bis-2,4-difluorophen-1-yl, dimethylcyclopentadienyl-Ti-bis-2,3,4,5,6-pentafluorophen-1-yl, dimethylcyclopentadienyl-Ti-bis-2,3,5,6-tetrafluorophen-1-yl, dimethylcyclopentadienyl-Ti-bis-2,6-difluorophen-1-yl, and dimethylcyclopentadienyl-Ti-bis-2,6-difluoro-3-(pyr-1-yl)-phen-1-yl; zirconocene compounds such as dicyclopentadienyl-Zr-dichloride, dicyclopentadiene-Zr-bisphenyl, dicyclopentadiene-Zr-bis-2,3,4,5,6-pentafluorophen-1-yl, dicyclopentadiene-Zr-bis-2,3,5,6-tetrafluorophen-1-yl, dicyclopentadiene-Zr-bis-2,5,6-trifluorophen-1-yl, dicyclopentadiene-Zr-bis-2,6-difluorophen-1-yl, dicyclopentadiene-Zr-bis-2,4-difluorophen-1-yl, dimethylcyclopentadienyl-Zr-bis-2,3,4,5,6-pentafluorophen-1-yl, dimethylcyclopentadienyl-Zr-bis-2,3,5,6-tetrafluorophen-1-yl, dimethylcyclopentadienyl-Zr-bis-2,6-difluorophen-1-yl, and dimethylcyclopentadienyl-Zr-bis-2,6-difluoro-3-(pyr-1-yl)-phen-1-yl; bismethylcyclopentadienyl-V-chloride; bispentamethylcyclopentadienyl-V-chloride; dicyclopentadienyl-Ru-chloride; and dicyclopentadienyl-Cr-chloride. These metallocene compounds can be used singly or in combination of two or more of them.

The metallocene compound can be used in a conventional catalytic amount. Specifically, the metallocene compound is generally used in an amount of 1 to 0.001 parts by weight, preferably 0.01 to 0.005 parts by weight, per 100 parts by weight of a polymerizable unsaturated compound to be polymerized.

The thiol compound to be used together with the metallocene compound in the present invention is a thiol compound having a crosslinkable silyl group. Such a crosslinkable silyl group-containing thiol compound is a compound generally represented by the following formula: HS—$R^3$.

Here, $R^3$ represents a group having a crosslinkable silyl group. Examples of a crosslinkable silyl group to be used include the same crosslinkable silyl groups as exemplified above with reference to the compound (A). Particularly, at least one crosslinkable silyl group selected from the group consisting of a hydroxysilyl group, a methoxysilyl group, an ethoxysilyl group, a propoxysilyl group, a chlorosilyl group, and a bromosilyl group is preferably used. Specific examples of $R^3$ include 3-mercaptopropyl-trimethoxysilane, 3-mercaptopropyl-triethoxysilane, 3-mercaptopropyl-monomethyldimethoxysilane, 3-mercaptopropyl-monophenyldimethoxysilane, 3-mercaptopropyl-dimethylmonomethoxysilane, 3-mercaptopropyl-monomethyldiethoxysilane, 4-mercaptobutyl-trimethoxysilane, and 3-mercaptobutyl-trimethoxysilane.

It can be considered that when such a crosslinkable silyl group-containing thiol compound is subjected to reaction, a hydrogen atom is removed from the thiol compound by mainly an organic metal compound, and as a result a radical, —S—$R^3$ is produced and is then introduced into at least one end of a resultant polymer. The activity of the crosslinkable silyl group introduced into the end of the polymer is not lost due to the reaction, and the activity of the introduced silyl group is maintained as it is.

As described above, removal of a hydrogen atom from the crosslinkable silyl group-containing thiol compound, HS—$R^3$ produces a radical, —S—$R^3$, and the radical is bonded to a polymerizable unsaturated compound to activate it, thereby initiating polymerization. At this time, the metallocene compound is used to remove a hydrogen atom from the crosslinkable silyl group-containing thiol compound, HS—$R^3$, thereby activating the crosslinkable silyl group-containing thiol compound. Therefore, in a case where the crosslinkable silyl group-containing thiol compound is used singly, a conversion (a rate of polymerization) is significantly low, that is, substantially no reaction occurs between the polymerizable unsaturated compounds in a case where the crosslinkable silyl group-containing thiol compound is used singly. As described above, the metallocene compound is mainly used to activate the crosslinkable silyl group-containing thiol compound, and usually exists with its original structure being maintained, that is, exists as a compound represented by the formula (1). However, there is a case where some of the metallocene compounds are bonded to the crosslinkable silyl group-containing thiol compound, the polymerizable unsaturated compound, and derivatives thereof. Further, there is also a case where this organometallic compound is decomposed as the reaction proceeds so that a reaction system contains a metal.

The amount of the crosslinkable silyl group-containing thiol compound to be used can be appropriately determined according to the properties of a target polymer. That is, when the concentration of the crosslinkable silyl group-containing thiol compound in a reaction system is increased, not only a conversion per unit time but also a final conversion is increased. At this time, an increase in the amount of the metallocene compound increases the conversion per unit time, but does not exert a large influence on the final conversion. Further, the amount of the metallocene compound to be used exerts little influence on the molecular weight of a resultant polymer, but the reaction does not effectively proceed when the metallocene compound is not used. Furthermore, when the amount of the thiol compound to be used is increased, the rate of polymerization becomes high. From the tendency, it can be considered that the metallocene compound to be used as one of catalysts for obtaining the compound (B) of the present invention has the function of an activation catalyst throughout the reaction, and the thiol compound to be used as the other catalyst for obtaining the compound (B) of the present invention has the function of initiating polymerization (that is, functions as a polymerization initiating species). As described above, it can be considered that the amount of the crosslikable silyl group-containing thiol compound to be used as a catalyst for obtaining the compound (B) of the present invention limits the molecular weight and the conversion.

Therefore, the amount of the crosslinkable silyl group-containing thiol compound to be used can be appropriately determined according to, for example, the molecular weight of a target polymer or the rate of polymerization, but the metallocene compound and the crosslinkable silyl group-containing thiol compound are generally used in a mole ratio of 100:1 to 1:50,000, preferably 10:1 to 1:10,000, to allow the reaction to smoothly proceed and prevent runaway of the reaction.

The total amount of the crosslinkable silyl group-containing thiol compound can be added at the initiation of the reaction. Alternatively, the crosslinkable silyl group-containing thiol compound may be added in such a manner that a part of the total amount of the crosslinkable silyl group-containing thiol compound is added at the initiation of the reaction and then the remaining crosslinkable silyl group-containing thiol compound is further added after the reaction is conducted for a desired period of time. In this case, the polymerizable unsaturated compound may also be added together with the remaining crosslinkable silyl group-containing thiol compound. By further adding the crosslinkable silyl group-containing thiol compound or by further adding the crosslinkable silyl group-containing thiol compound together with the polymerizable unsaturated compound, it is possible to increase the conversion.

As described above, the component (B) of the present invention, that is, the (meth)acrylic polymer can be obtained by reacting the polymerizable unsaturated compound by the use of the metallocene compound represented by the above specific formula (1) and the crosslinkable silyl group-containing thiol compound. In the present invention, the crosslinkable silyl group-containing thiol compound can be used together with a thiol compound such as an alkyl thiol having no functional group other than a thiol group (e.g., ethyl mercaptan, butyl mercaptan, hexylmercaptan, tertiary dodecyl mercaptan, normal dodecyl mercaptan, octyl mercaptan) or an aromatic thiol having no functional group other than a thiol group (e.g., phenyl mercaptan, benzyl mercaptan), a thiol compound having a functional group in addition to a thiol group (e.g., β-mercaptopropionic acid, mercaptoethanol, thiophenol), a polyfunctional thiol compound obtained by esterifying trithioglycerin or pentaerythritol with β-mercaptopropionic acid or a polymeric thiol containing an active thiol group, such as a polysulfide-based polymer.

In the present invention, for the purpose of controlling the rate of polymerization and the degree of polymerization, a disulfide compound, a trisulfide compound or a tetrasulfide compound can be used in addition to the metallocene compound and the crosslinkable silyl group-containing thiol compound to be used as polymerization initiating catalysts. Examples of such disulfide, trisulfide and tetrasulfide compounds to be used as a polymerization controller include diethyl trisulfide, dibutyl tetrasulfide, diphenyl disulfide, bis (2-hydroxyethyl) disulfide, bis(4-hydroxybutyl) tetrasulfide, bis(3-hydroxypropyl) trisulfide, bis(3-carboxypropyl) trisulfide, bis(3-carboxypropyl) tetrasulfide, bis(3-propyltrimethoxysilane) disulfide, and bis(3-propyltriethoxysilane) tetrasulfide. These sulfide compounds can be used singly or in combination of two or more of them. Such a sulfide compound can be used in such an amount that the polymerization according to the present invention is not deactivated. Specifically, the sulfide compound is generally used in an amount of 50 to 0 parts by weight, preferably 20 to 0.005 parts by weight, per 100 parts by weight of the polymerizable unsaturated compound to be polymerized.

The main chain of the component (B) of the present invention, that is, of the (meth)acrylic polymer is formed by polymerizing the polymerizable unsaturated compound as described below. Examples of such a polymerizable unsaturated compound include polymerizable unsaturated compounds represented by the following formulas (7) to (9).

[Formula 7]

(7)

In the formula (7), $R^4$ to $R^6$ each independently represent a hydrogen atom, a halogen atom or an alkyl group having 1 to 3 carbon atoms; and $R^7$ represents a hydrogen atom, an alkali metal atom or a hydrocarbon group having 1 to 22 carbon atoms (the hydrocarbon group may be linear or may have a side chain; at least part of hydrogen atoms of the hydrocarbon group or of a group constituting the side chain of the hydrocarbon group may be substituted with at least one polar group or reactive functional group selected from the group consisting of a chlorine atom, a fluorine atom, a primary amino group, a secondary amino group, a tertiary amino group, a quaternary amine salt group, an amido group, an isocyanate group, an alkylene oxide group, a hydroxysilyl group, a methoxysilyl group, an ethoxysilyl group, a propoxysilyl group, a chlorosilyl group, a buromosilyl group, and a glycidyl group;

the hydrocarbon group may have a double bond; and the hydrocarbon group may have a cyclic structure). Specific examples of $R^7$ include an alkyl group, a cycloalkyl group, an aryl group, an alkenyl group, a cycloalkenyl group, an alkoxy group, and an alkyl ether group. At least part of hydrogen atoms constituting the group $R^7$ may be substituted with, for example, a halogen atom, a sulfonic acid group or a glycidyl group.

[Formula 8]

(8)

In the formula (8), $R^{11}$ to $R^{13}$ have the same meaning as the above $R^4$ to $R^6$, and $R^{14}$ represents any of a hydroxyl group, —CO—$NH_2$, —CN, a glycidyl group, an alkyl group, an alkoxy group, an alkenyl group, a cycloalkenyl group, an aryl group, an allyl ether group, and an alkyl ether group. At least part of hydrogen atoms constituting the group $R^{14}$ may be substituted with, for example, a halogen atom. Further, the group $R^{14}$ may be a group containing a structural unit derived from alkylene glycol, a methylol group or an alkoxyamido group.

[Formula 9]

(9)

In the formula (9), $R^{15}$ and $R^{17}$ have the same meaning as the above $R^4$ to $R^6$, and $R^{16}$ and $R^{18}$ each independently represent any of a carboxyl group, a hydroxyl group, —CO—$NH_2$, —CN, a glycidyl group, an alkyl group, an alkoxy group, an alkenyl group, a cycloalkenyl group, and an aryl group. At least part of hydrogen atoms constituting the groups $R^{16}$ and $R^{18}$ may be substituted with, for example, a halogen atom. Further, the groups $R^{16}$ and $R^{18}$ may cooperate with two carbon atoms bonded to $R^{15}$ and $R^{17}$ to form a cyclic structure, and the cyclic structure may have a double bond.

Specific examples of such polymerizable unsaturated compounds include: acrylic acid and salts thereof such as alkali metal acrylates; methacrylic acid and salts thereof such as alkali metal methacrylates; alkyl esters of acrylic acid such as methyl acrylate, ethyl acrylate, propyl acrylate, butyl acrylate, pentyl acrylate, hexyl acrylate, 2-ethylhexyl acrylate, octyl acrylate, nonyl acrylate, decyl acrylate, and dodecyl acrylate; aryl esters of acrylic acid such as phenyl acrylate and benzyl acrylate; alkoxyalkyl acrylates such as methoxyethyl acrylate, ethoxyethyl acrylate, propoxyethyl acrylate, butoxyethyl acrylate, and ethoxypropyl acrylate; alkyl esters of methacrylic acid such as methyl methacrylate, ethyl methacrylate, propyl methacrylate, butyl methacrylate, pentyl methacrylate, hexyl methacrylate, 2-ethylhexyl methacrylate, octyl methacrylate, nonyl methacrylate, decyl methacrylate, and dodecyl methacrylate; aryl esters of methacrylic acid such as phenyl methacrylate and benzyl methacrylate; alkoxyalkyl methacrylates such as methoxyethyl methacrylate, ethoxyethyl methacrylate, propoxyethyl methacrylate, butoxyethyl methacrylate, and ethoxypropyl methacrylate; (poly)alkylene glycol diacrylates such as ethylene glycol diacrylate, diethylene glycol diacrylate, triethylene glycol diacrylate, polyethylene glycol diacrylate, propylene glycol diacrylate, dipropylene glycol diacrylate, and tripropylene glycol diacrylate; (poly)alkylene glycol dimethacrylates such as ethylene glycol dimethacrylate, diethylene glycol dimethacrylate, triethylene glycol dimethacrylate, polyethylene glycol dimethacrylate, propylene glycol dimethacrylate, dipropylene glycol dimethacrylate, and tripropylene glycol dimethacrylate; polyacrylates such as trimethylolpropane triacrylate; polymethacrylates such as trimethylolpropane trimethacrylate; acrylonitrile; methacrylonitrile; vinyl acetate; vinylidene chloride; vinyl halide compounds such as 2-chloroethyl acrylate and 2-chloroethyl methacrylate; acrylic acid esters of alicyclic alcohol such as cyclohexyl acrylate; methacrylic acid esters of alicyclic alcohol such as cyclohexyl methacrylate; oxazoline group-containing polymerizable compounds such as 2-vinyl-2-oxazoline, 2-vinyl-5-methyl-2-oxazoline, and 2-isopropenyl-2-oxazoline; aziridine group-containing polymerizable compounds such as acryloyl aziridine, methacryloyl aziridine, 2-aziridinylethyl acrylate, and 2-aziridinylethyl methacrylate; epoxy group-containing vinyl monomers such as allyl glycidyl ether, glycidyl ether acrylate, glycidyl ether methacrylate, glycidyl ether acrylate, 2-ethylglycidyl ether acrylate, and 2-ethylglycidyl ether methacrylate; hydroxyl group-containing vinyl compounds such as 2-hydroxyethyl acrylate, 2-hydroxyethyl methacrylate, 2-hydroxypropyl acrylate, monoesters of acrylic acid or methacrylic acid and polypropylene glycol or polyethylene glycol, and adducts of lactons and 2-hydroxyethyl(meth)acrylate; fluorinated vinyl monomers such as fluorinated alkyl methacrylates and fluorinated alkyl acrylates; unsaturated carboxylic acids other than (meth)acrylic acid, such as itaconic acid, crotonic acid, maleic acid, and fumaric acid, salts thereof, (partial)ester compounds and anhydrides thereof; reactive halogen-containing vinyl monomers such as 2-chloroethyl vinyl ether and vinyl monochloroacetate; amido group-containing vinyl monomers such as methacrylamide, N-methylolmethacylamide, N-methoxyethylmethacrylamide, and N-butoxymethylmethacrylamide; and diene compounds such as ethylidenenorbornene, isoprene, pentadiene, vinylcyclohexene, chloroprene, butadiene, methylbutadiene, cyclobutadiene and methylbutadiene.

Other examples of the polymerizable unsaturated compound include macromonomers having a radical polymerizable vinyl group at the end of a vinyl-polymerized monomer (e.g., fluoromonomers, silicon-containing monomers, macromonomers, styrene, silicone). These polymerizable unsaturated compounds can be used singly or in combination of two or more of them. Further, these polymerizable unsaturated compounds may be liquid, solid or gaseous under reaction conditions, but a liquid monomer is preferably used for the reaction from the viewpoint of ease of operation.

As described above, the component (B) of the present invention, that is, the (meth)acrylic polymer is a polymer which can be obtained by polymerizing the polymerizable unsaturated compound by various polymerization methods in the presence of a polymerization catalyst composed of the metallocene compound and the crosslinkable silyl group-containing thiol compound, and at least one molecular end of the (meth)acrylic polymer is bonded to —S—$R^3$ obtained by removing a hydrogen bonded to a sulfur atom from the crosslinkable silyl group-containing thiol compound. As a result of polymerization of the polymerizable unsaturated compound as described above, a repeating unit represented by, for example, the following formulas (2), (10) and (11) are formed in the main chain of the (meth)acrylic polymer depending on the polymerizable unsaturated compound used.

[Formula 2]

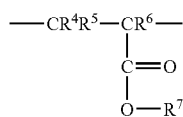

(2)

In the formula (2), $R^4$ to $R^6$ each independently represent a hydrogen atom, a halogen atom or an alkyl group having 1 to 3 carbon atoms, and $R^7$ represents a hydrogen atom, an alkali metal atom or a hydrocarbon group having 1 to 22 carbon atoms (the hydrocarbon atom may be linear or may have a side chain; at least part of hydrogen atoms of the hydrocarbon group or of a group constituting the side chain of the hydrocarbon group may be substituted with at least one polar group or reactive functional group selected from the group consisting of a chlorine atom, a fluorine atom, a primary amino group, a secondary amino group, a tertiary amino group, a quaternary amine salt group, an amido group, an isocyanate group, an alkylene oxide group, a hydroxysilyl group, a methoxysilyl group, an ethoxysilyl group, a propoxysilyl group, a chlorosilyl group, a buromosilyl group, and a glycidyl group; the hydrocarbon group may have a double bond; and the hydrocarbon group may have a cyclic structure). Specific examples of $R^7$ include an alkyl group, a cycloalkyl group, an aryl group, an alkenyl group, a cycloalkenyl group, an alkoxy group, and an alkyl ether group. At least part of hydrogen atoms constituting the group $R^7$ may be substituted with, for example, a halogen atom, a sulfonic acid group or a glycidyl group.

[Formula 10]

$$—CR^{11}R^{12}—CR^{13}—$$
$$\mid$$
$$R^{14}$$

(10)

In the formula (10), $R^{11}$ to $R^{13}$ have the same meaning as the above $R^4$ to $R^6$, and $R^{14}$ represents any of a hydroxyl group, —CO—NH$^2$ group, —CN group, a glycidyl group, an alkyl group, an alkoxy group, an alkenyl group, a cycloalkenyl group, an aryl group, an allyl ether group, and an alkyl ether group. At least part of hydrogen atoms constituting the group $R^{14}$ may be substituted with, for example, a halogen atom. Further, the group $R^{14}$ may be a group containing a structural unit derived from alkylene glycol, an alkoxysilyl group, an alkylalkoxysilyl group, a methylol group or an alkoxyamido group.

[Formula 11]

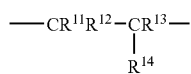

(11)

In the formula (11), $R^{15}$ and $R^{17}$ have the same meaning as the above $R^4$ to $R^6$, and $R^{16}$ and $R^{18}$ each independently represent any of a carboxyl group, a hydroxyl group, —CO—NH$_2$ group, —CN group, a glycidyl group, an alkyl group, an alkoxy group, an alkenyl group, a cycloalkenyl group, and an aryl group. At least part of hydrogen atoms constituting the groups $R^{16}$ and $R^{18}$ may be substituted with, for example, a halogen atom. Further, the groups $R^{16}$ and $R^{18}$ may cooperate with two carbon atoms bonded to $R^{15}$ and $R^{17}$ to form a cyclic structure, and the cyclic structure may have a double bond.

The main chain of the component (B) of the present invention, that is, of the (meth)acrylic polymer is not particularly limited, but preferably contains the repeating unit represented by the formula (2) in an amount of 50 to 100% by weight.

The component (B) of the present invention, that is, the (meth)acrylic polymer may be produced by copolymerizing with a crosslinkable silyl group-containing polymerizable unsaturated monomer [E]. Examples of the crosslinkable silyl group include the same crosslinkable silyl groups as exemplified above with reference to the component (A). Particularly, such a crosslinkable silyl group is preferably at least one selected from the group consisting of a hydroxysilyl group, a methoxysilyl group, an ethoxysilyl group, a propoxysilyl group, a chlorosilyl group, and a bromosilyl group. The crosslinkable silyl group-containing polymerizable unsaturated monomer [E] usable in the present invention can be represented by, for example, the following formula (12):

[Formula 12]

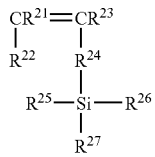

(12)

In the above formula, $R^{21}$ and $R^{23}$ have the same meaning as the above $R^4$ to $R^6$; $R^{22}$ represents any group or atom selected from a hydrogen atom, a halogen atom, —CN group, a glycidyl group, an alkyl group, an alkoxy group, an alkenyl group, a cycloalkenyl group, an aryl group, an allyl ether group, an alkyl ether group, an alkoxysilyl group, and an alkylalkoxysilyl group; when $R^{22}$ is a group other than a hydrogen atom and a halogen atom, at least part of hydrogen atoms constituting the group $R^{22}$ may be substituted with, for example, a halogen atom; $R^{22}$ may be a group containing a structural unit derived from alkylene glycol, an alkoxysilyl group, an alkylalkoxysilyl group, a methylol group or an alkoxyamido group; $R^{24}$ is a bivalent group such as —CO—O—, —CH$_2$—, —C$_2$H$_4$—, —CO—O—C$_2$H$_4$— or —CO—O—C$_2$H$_4$—O—, or a single bond; and $R^{25}$, $R^{26}$, and $R^{27}$ each independently represent any of an alkyl group, an alkoxy group, a hydrogen atom, and a halogen atom.

By copolymerizing with the compound represented by the formula (12), it is possible to introduce a repeating unit represented by the following formula (13) into the main chain:

[Formula 13]

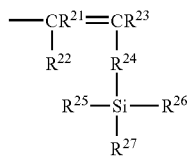

(13)

(In the formula (13), $R^{21}$ to $R^{27}$ have the same meaning as described with reference to the formula (12).)

The repeating unit represented by the formula (13) is preferably introduced into the main chain of the component (B) of the present invention, that is, of the (meth)acrylic polymer in an amount of 1 to 50% by weight, particularly preferably 5 to 30% by weight, in terms of monomer based on the amount of the total repeating units. By introducing the repeating unit (13) into the main chain of the (meth)acrylic polymer (B) in such an amount, it is possible to impart self-reactive curability to the (meth)acrylic polymer (B). In addition, it is also possible for the (meth)acrylic polymer (B) to react with a silane coupling agent having a crosslinkable alkoxysilyl group, a silanol compound, a metal alkoxide such as tetraethoxy titanium, a metal chelate such as a metal alkolate or a resin composition having an alkoxysilyl group, such as a silicone resin to form an excellent cured body. It is to be noted that the repeating unit represented by the formula (13) can be introduced not only by using the crosslinkable silyl group-containing polymerizable unsaturated monomer [E] but also after having prepared a (meth)acrylic polymer by reacting the obtained (meth)acrylic polymer with a crosslinkable silyl group-containing compound.

Examples of the monomer [E] capable of forming a repeating unit represented by the formula (13) include: vinyl compound monomers in which a crosslinkable silyl group is directly introduced into a vinyl group, such as vinyltrimethoxy silane, γ-vinyl-monochlorodimethoxy silane, γ-vinyl-trichloro silane, and γ-vinyl-dichloro-monomethyl silane; (meth)acrylic monomers in which a crosslinkable silyl group is introduced into a highly reactive (meth)acryloyl group, such as γ-methacryloxypropyl trimethoxy silane, γ-methacryloxypropyl triethoxy silane, γ-methacryloxypropyl monomethyldimethoxy silane, and γ-acryloxypropyl trimethoxy silane; and polymerizable monomers in which a crosslinkable silyl group is introduced into a compound having a polymerizable unsaturated group, such as allyltrimethoxysilane and trimethoxysilylpropylallylamine.

The (meth)acrylic polymer (B), especially the (meth)acrylic polymer having a repeating unit represented by the formula (13) can be produced by (co)polymerizing the polymerizable unsaturated compound described above in the presence of the compound represented by the formula (1) and the crosslinkable silyl group-containing thiol compound. Such a reaction can be carried out regardless of the presence or absence of a solvent or dispersion medium, but nonaqueous polymerization is preferably employed from the viewpoint of stability of crosslinkable silyl groups.

The polymerization reaction is generally carried out in an inert gas atmosphere under conditions where a conventional radical polymerization is carried out. Therefore, an active gas such as oxygen is not present in the polymerization reaction system. Examples of an inert gas to be used include a nitrogen gas, an argon gas, a helium gas and a carbonic acid gas. As described above, the component (B) of the present invention is a polymer obtained by polymerizing the polymerizable unsaturated compound in the presence of the specific organic metal compound and the crosslinkable silyl group-containing thiol compound, and at least one end of the thus obtained polymer (in most cases, almost all of the ends of the polymer) is bonded to a residue ($-S-R^3$) obtained by removing a hydrogen atom bonded to a sulfur atom from the crosslinkable silyl group-containing thiol compound.

In such polymerization, a polymerization catalyst composed of the metallocene compound represented by the formula (1) and the crosslinkable silyl group-containing thiol compound can be used in a catalytic amount generally employed, but the metallocene compound represented by the formula (1) is generally used in an amount of 0.0000001 to 0.0001 mol per mol of an unsaturated group of the polymerizable unsaturated compound, preferably in such an amount that the mole ratio of the metallocece compound and the crosslinkable silyl group-containing thiol compound is in the range of 10:1 to 1:10,000 in accordance with the number of moles of the crosslinkable silyl group-containing thiol compound to be used. The crosslinkable silyl group-containing thiol compound is generally used in an amount of 0.00001 to 0.7 mol, preferably 0.0001 to 0.5 mol.

Such a polymerization reaction can be carried out with heating, warming or cooling according to the kind of polymerizable unsaturated compound to be used, but the polymerization reaction temperature is preferably set in the range of 0 to 150° C., particularly preferably in the range of 25 to 120° C. By setting the polymerization reaction temperature to a value within the above range, it is possible to allow the reaction to stably proceed without runaway of reaction. The reaction temperature depends on the activity of an unsaturated group of the polymerizable unsaturated compound to be used. However, even in a case where a (meth)acrylic ester-based polymerizable unsaturated compound having relatively high polymerizability, if the reaction temperature is set at 0° C. or lower, the catalytic activity of the metallocene compound represented by the formula (1) and the crosslinkable silyl group-containing thiol compound is decreased so that the time required for achieving a sufficient conversion is prolonged, thereby reducing efficiency. On the other hand, even in a case where a compound having low polymerizability such as styrene-type unsaturated compound is used, a satisfactory conversion can be achieved as long as the reaction temperature is set at 25° C. or higher.

If the reaction temperature is set 150° C. or higher, there is a danger of runaway reaction attributed to significant heat generation during the polymerization reaction. On the other hand, by setting the polymerization reaction temperature at 120° C. or lower, it is possible to maintain a smooth progress of the reaction without runaway of the reaction. In the polymerization according to the present invention, the reaction time can be appropriately set in view of, for example, conversion and molecular weight, but for example, the reaction time is generally set in the range of 2 to 12 hours, preferably in the range of 2 to 8 hours under the above conditions.

The polymerization reaction can be terminated by lowering the temperature of the reaction mixture or preferably by adding a polymerization terminator such as benzoquinone. By carrying out polymerization in the above manner, it is possible to obtain a polymer generally having a conversion of 40% or higher, preferably 60% or higher. The weight average molecular weight (Mw) of the thus obtained polymer measured by gel permeation chromatography (GPC) is generally in the range of 500 to 1,000,000, preferably in the range of 1,000 to 300,000, and the number average molecular weight (Mn) is generally in the range of 500 to 1,000,000, preferably in the range of 1,000 to 100,000. Further, the dispersion index of the polymer (weight average molecular weight/number average molecular weight) is generally in the range of 1.02 to 9.0, preferably in the range of 1.2 to 3.0.

In a case where a deliming process is not performed, the component (B) of the present invention, that is, the polymer obtained by polymerization using the polymerization catalyst also contains an organic metal compound. Further, a sulfur-containing group derived from the thiol used is bonded to at least part of the molecular ends of the obtained polymer. In the polymerization reaction using the catalyst described above, the crosslinkable silyl group-containing thiol compound is used as a polymerization initiating species, but generally such a crosslinkable silyl group-containing thiol compound does not have activity as polymerization initiating species when used singly. However, in a case where the organometallic compound represented by the formula (1) is used together with the crosslinkable silyl group-containing thiol compound, a crosslinkable silyl group-containing thiol group derived from the crosslinkable silyl group-containing thiol compound is converted into an active species capable of initiating polymerization by the organometallic catalyst, to thereby become an initiating species for monomers. Therefore, in this reaction, the conversion per unit time is enhanced by an increase in the amount of the crosslinkable silyl group-containing thiol compound relative to the amount of monomer. A sulfur-containing group derived from the crosslinkable silyl group-containing thiol compound used is bonded to the polymerization initiation terminal of the obtained polymer. However, the crosslinkable silyl group-containing thiol compound used functions not only as a polymerization initiating species but also as a chain transfer agent, and therefore the molecular weight (degree of polymerization) and the conversion greatly depend on the amount of the crosslinkable silyl group-containing thiol compound. From these phenomena, it can be supposed that the progress and termination of polymerization in this reaction are those of radical polymerization. The thio-radical (—S) of the crosslinkable silyl group-containing thiol compound from which a hydrogen atom is removed by chain transfer again functions as a polymerization initiating species and attacks the monomer. Therefore, a sulfur-containing group derived from the crosslinkable silyl group-containing thiol compound used is bonded to the terminal of a polymer obtained by this polymerization method, irrespective of the amount of the crosslinkable silyl group-containing thiol compound used.

In the reaction system of the component (B) of the present invention, polymerization can be carried out in the same manner as in solution polymerization or bulk polymerization in a polar organic solvent such as an alcohol or in a dispersion medium such as water. Therefore, it can be considered that a radical reaction is predominant in the polymerization reaction according to the present invention. Accordingly, it can be considered that the reaction termination end of an obtained polymer is hydrogen removed from the silyl group-containing thiol compound due to chain transfer, or thiols having a thio-radical converted into a radical and a sulfur-containing group derived from the silyl group-containing thiol compound due to radical coupling with a growing polymer radical.

In the obtained polymer, the metallocene compound remains with its original form being maintained, or is bonded to another organic group, or remains in the form of metal. On the other hand, the crosslinkable silyl group-containing thiol compound directly contributes to the reaction of forming a polymer, and the reaction proceeds while the crosslinkable silyl group-containing thiol compound itself is being decomposed so that a terminal group derived from the crosslinkable silyl group-containing thiol compound is introduced into the polymer end.

The activity of a crosslinkable silyl group in a group which is derived from the crosslinkable silyl group-containing thiol compound and is bonded to the polymer end is not lost due to the polymerization reaction, and is retained in an obtained polymer. The estimation and progress of the reaction are believed to the most rational by the inventors based on various phenomena occurring in the reaction according to the present invention, which naturally in no way limits the present invention.

As the component (B) of the present invention, a (meth) acrylic polymer (B1) is particularly preferable. Specifically, the (meth)acrylic polymer (B1) contains a (meth)acrylic polymer obtained by polymerizing a (meth)acrylic monomer having a polymerizable unsaturated bond in the presence of the metallocene compound represented by the formula (1) and a thiol compound containing at least one crosslinkable silyl group in the molecule, at least one end of the (meth) acrylic polymer being bonded to a residue, —S—$R^3$ (where $R^3$ represents a group having a crosslinkable silyl group) obtained by removing a hydrogen atom from the thiol compound, and the main chain of the (meth)acrylic polymer contains a repeating unit represented by the formula (2) in an amount of 99% by weight or less, preferably 95 to 70% by weight and further contains as a repeating unit other than the repeating unit represented by the formula (2), a repeating unit derived from the polymerizable unsaturated compound (E) containing at least one crosslinkable silyl group in the molecule, in an amount of 1 to 50% by weight, preferably 5 to 30% by weight.

In addition to the repeating unit represented by the formula (2) and the repeating unit derived from the polymerizable unsaturated compound monomer represented by the formula (12), the (meth)acrylic polymer (B1) may further contain, for example, a repeating unit represented by the formulae (10) and (11) or a repeating unit derived from another monomer containing a reactive unsaturated bond, such as a dimer or trimer of ethylene or propylene. The amount of the repeating unit derived from another monomer to be copolymerized is usually 0 to 40% by weight, preferably 0 to 20% by weight. It is to be noted that the amount of each of the repeating units to be copolymerized in the (co)polymer is based on a total of 100% by weight.

The weight average molecular weight (Mw) of the (meth) acrylic polymer (B1) measured by gel permeation chromatography is generally in the range of 500 to 1,000,000, preferably in the range of 1,000 to 300,000, and the number average molecular weight (Mn) is generally in the range of 500 to 1,000,000, preferably in the range of 1,000 to 100,000. Further, the dispersion index (weight average molecular weight/number average molecular weight) of the (meth) acrylic polymer (B1) is generally in the range of 1.02 to 9.0, preferably in the range of 1.2 to 3.0.

Such a (meth)acrylic polymer (B1) is generally a viscous liquid when containing a solvent or including a resin content only, but is cured by reaction in the presence of a blended curing agent or the like. The thus obtained cured product has elasticity and plasticity. The crosslinkable silyl group derived from the formula (12) and introduced into the main chain of the (meth)acrylic polymer (B1) including the repeating units described above and having a component unit derived from the silyl group-containing thiol compound at the end thereof and the crosslinkable silyl group introduced into the molecular end of the (meth)acrylic polymer (B1) are highly reactive, and therefore the (meth)acrylic polymer (B1) is cured by self-condensation reaction, condensation crosslinking reaction, or combination of self-condensation reaction and condensation crosslinking reaction.

The blending ratio of the component (B) is not particularly limited, but is preferably 0.01 to 100 parts by weight, particularly preferably 0.1 to 90 parts by weight, per 1 part by weight of the component (A). These (meth)acrylic polymers can be used singly or in combination of two or more of them.

It is preferred that the curable composition of the present invention is further mixed with a component (C), that is, a curing catalyst. Examples of the curing catalyst as the component (C) include, but are not limited to, organometallic compounds and amines. Particularly, a silanol condensation catalyst is preferably used. Examples of the silanol condensation catalyst include: organotin compounds such as stannous octoate, dibutyltin dioctoate, dibutyltin dilaurate, dibutyltin maleate, dibutyltin diacetate, dibutyltin diacetylacetonate, dibutyltin oxide, dibutyltin bistriethoxysilicate, dibutyltin distearate, dioctyltin dilaurate, dioctyltin diversatate, tin octylate, and tin naphthenate; organotin compounds (C1) represented by the following general formula (5); reaction products of dibutyltin oxide with phthalate esters; titanates such as tetrabutyl titanate and tetrapropyl titanate; organoaluminum compounds such as aluminum trisacetylacetonate, aluminum trisethylacetoacetate, and diisopropoxy aluminum ethylacetoacetate; chelate compounds such as zirconium tetraacetylacetonate and titanium tetraacetylacetonate; organic acid salts of lead such as lead octylate and lead naphthenate; organic acid salts of bismuth such as bismuth octylate, bismuth neodecanoate, and bismuth rosinate; and other acid catalysts and basic catalysts well known as silanol condensation catalysts:

[Formula 5]

$$R^9R^{10}SnO \quad (5)$$

In the formula (5), $R^9$ and $R^{10}$ each represent a monovalent hydrocarbon group. Preferred examples of $R^9$ and $R^{10}$ include, but are not limited to, monovalent hydrocarbon groups having about 1 to 20 carbon atoms such as methyl, ethyl, propyl, butyl, amyl, dodecyl, lauryl, propenyl, phenyl, and tolyl groups. $R^9$ and $R^{10}$ may be the same or different. Particularly preferred examples of the organotin compound (C1) represented by the general formula (5) include dialkyltin oxides such as dimethyltin oxide, dibutyltin oxide, and dioctyltin oxide.

In a case where the organotin compound (C1) represented by the general formula (5) is used as the component (C), the curable composition containing at least the components (A), (B) and (C1) and being packed in a hermetically sealed container is preferably subjected to reaction treatment to develop quick curability. The reaction treatment is carried out in the same manner as in the manufacturing method of the curable composition of the present invention described later.

The blending ratio of the component (C) is preferably 0.1 to 30 parts by weight, particularly preferably 0.5 to 20 parts by weight, per 100 parts by weight of the component (A) from the viewpoint of, for example, a crosslinking rate and the physical properties of a cured product. These curing catalysts can be used singly or in combination of two or more of them.

It is preferred that the curable composition of the present invention further contain a component (D), that is, a silane coupling agent from the viewpoint of improvement in adhesion properties and acceleration of curing. Examples of such a silane coupling agent include, but are not limited to, well-known ones, for example, aminosilanes such as aminoethylaminopropyltrimethoxysilane, aminoethylaminopropylmethyldimethoxysilane, and aminoethylaminopropylmethylmethoxysilane, epoxysilanes such as γ-glycidoxypropyltrimethoxysilane, (meth)acrylic silanes such as γ-methacryloxypropyltrimethoxysilane, mercaptosilanes such as γ-mercaptopropyltrimethoxysilane, and isocyanate silanes such as γ-isocyanatepropyltrimethoxysilane.

The blending ratio of the component (D) is not particularly limited, but is preferably about 0.1 to 30 parts by weight, more preferably 0.3 to 15 parts by weight, per 100 parts by weight of the component (A). These silane coupling agents can be used singly or in combination of two or more of them.

If necessary, the curable composition of the present invention may be further mixed with various materials such as physical property-modifiers, fillers, plasticizers, thixotropic agents, dehydrating agents (storage stability improvers), tackifiers, anti-sagging agents, ultraviolet absorbers, antioxidants, flame retardants, coloring agents, and radical polymerization initiators, in addition to the above-described components, or may be blended with various solvents such as toluene and alcohol or with other compatible polymers.

The physical property-modifier is added to improve tensile properties. Examples of the physical property-modifier include: silicon compounds having one silanol group in one molecule, such as triphenylsilanol, trialkylsilanol, dialkylphenylsilanol, and diphenylalkylsilanol; and various silane coupling agents such as silicon compounds producing a compound having one silanol group in one molecule by hydrolysis, such as triphenylmethoxysilane, trialkylmethoxysilane, dialkylphenylmethoxysilane, diphenylalkylmethoxysilane, triphenylethoxysilane, and trialkylethoxysilane. These physical property-modifiers can be used singly or in combination of two or more of them.

The filler is added to reinforce a cured product. Examples of such a filler include calcium carbonate, magnesium carbonate, diatomite, hydrous silicic acid, silicic acid anhydride, calcium silicate, silica, titanium dioxide, clay, talc, carbon black, slate powder, mica, kaolin, and zeolite. Among them, calcium carbonate is preferably used, and calcium carbonate treated with fatty acid is more preferably used. Alternatively, glass beads, silica beads, alumina beads, carbon beads, styrene beads, phenol beads, acrylic beads, porous silica, shirasu balloon, glass balloon, silica balloon, saran balloon, or acrylic balloon may also be used. Among them, acrylic balloon is preferably used from the viewpoint of less reduction in elongation of a cured composition. These fillers can be used singly or in combination of two or more of them.

The plasticizer is added to improve the elongation properties of a cured product and achieve low modulus. Examples of such a plasticizer include: esters of phosphoric acid such as tributyl phosphate and tricresyl phosphate; esters of phthalic acid such as dioctyl phthalate (DOP), dibutyl phthalte, and butylbenzyl phthalate; esters of fatty monobasic acids such as glycerol monooleate; esters of fatty dibasic acids such as dibutyl adipate and dioctyl adipate; glycol esters such as polypropylene glycol; aliphatic esters; epoxy plasticizers; polyester-based plasticizers; polyethers; polystyrenes; and acrylic plasticizers. These plasticizers can be used singly or in combination of two or more of them.

Examples of the thixotropic agent include inorganic thixotropic agents such as colloidal silica and asbestos powder, organic thixotropic agents such as organic bentonite, modified polyester polyols, and fatty acid amides, hydrogenated castor oil derivatives, fatty acid amide waxes, aluminum stearate, and barium stearate. These thixotropic agents can be used singly or in combination of two or more of them.

The dehydrating agent is added to remove moisture during storage. Examples of the dehydrating agent include silane compounds such as vinyltrimethoxysilane, dimethyldimethoxysilane, tetraethoxysilane, methyltrimethoxysilane, and methyltriethoxysilane.

The antioxidant is used to in order to prevent oxidation of cured sealants, thereby improving weatherability thereof. Examples of such an antioxidant include hindered amine-based antioxidants and hindered phenol-based antioxidants. Examples of hindered amine-based antioxidants include, but are not limited to, N,N',N'',N'''-tetrakis-(4,6-bis(butyl-(N-methyl-2,2,6,6-tetramethylpiperidine-4-yl)amino)-triazine-2-yl)-4,7-diazadecane-1,10-diamine, a polycondensate of dibutylamine, 1,3,5-triazine, N,N'-bis-(2,2,6,6-tetramethyl-4-piperidyl-1,6-hexamethylenediamine, and N-(2,2,6,6-tetramethyl-4-piperidyl)butylamine, poly[{6-(1,1,3,3-tetramethylbutyl)amino-1,3,5-triazine-2,4-diyl}{(2,2,6,6-tetranethyl-4-piperidyl)imino}hexamethylene{(2,2,6,6-tetramethyl-4-piperidyl)imino}], a polymer of dimethyl succinate with 4-hydroxy-2,2,6,6-tetramethyl-1-piperidine ethanol, [decanedioic acid bis(2,2,6,6-tetramethyl-1(octyloxy)-4-piperidyl)ester, a reaction product of 1,1-dimethylethylhydroperoxide and octane (70%)]-polypropylene (30%), bis(1,2,2,6,6-pentamethyl-4-piperidyl)[[3,5-bis(1,1-dimethylethyl)-4-hydroxyphenyl]methyl]butylmalonate, methyl 1,2,2,6,6-pentamethyl-4-piperidyl sebacate, bis(2,2,6,6-tetramethyl-4-piperidyl)sebacate, bis(1,2,2,6,6-pentamethyl-4-piperidyl)sebacate, 1-[2-[3-(3,5-di-tert-butyl-4-hydroxyphenyl)propionyloxy]ethyl]-4-[3-(3,5-di-tert-butyl-4-hydroxyphenyl(propionyloxy)-2,2,6,6-tetramethylpiperidine, 4-benzoyloxy-2,2,6,6-tetramethylpiperidine, and 8-acetyl-3-dodecyl-7,7,9,9-tetramethyl-1,3,8-triazaspiro[4.5]decane-2,4-dione. Examples of hindered phenol-based antioxidants include, but are not limited to, pentaerythritol-tetrakis[3-(3,5-di-tert-butyl-4-hydroxyphenyl)propionate], thiodiethylene-bis[3-(3,5-di-tert-butyl-4-hydroxyphenyl)propionate], octadecyl-3-(3,5-di-tert-butyl-4-hydroxyphenyl)propionate, N,N'-hexane-1,6-diylbis[3-(3,5-di-tert-butyl-4-hydroxyphenylpropionamide)], benzenepropanoic acid, 3,5-bis(1,1-dimethylethyl)-4-hydroxy-C7-C9-branched alkyl ester, 2,4-dimethyl-6-(1-methylpentadecyl)phenol, diethyl [[3,5-bis(1,1-dimethylethyl)-4-hydroxyphenyl]methyl]phosphonate, 3,3',3'',5,5',5''-hexa-tert-butyl-4-a,a',a''-(mesitylene-2,4,6-triyl)tri-p-cresol, calciumdiethyl bis[[[3,5-bis-(1,1-dimethylethyl)-4-hydroxyphenyl]methyl] phosphonate], 4,6-bis(octylthiomethyl)-o-cresol, ethylene bis(oxyethylene)bis[3-(5-tert-butyl-4-hydroxy-m-tolyl)propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6-(1H, 3H, 5H)-trione, a reaction product of N-phenylbenzeneamine with 2,4,4-trimethylpentene, and 2,6-di-tert-butyl-4-(4,6-bis(octylthio)-1,3,5-triazine-2-ylamino)phenol. These antioxidants can be used singly or in combination of two or more of them.

The ultraviolet absorber is used to prevent photo deterioration of a cured sealing material and to improve weatherability of the cured sealing material, and includes examples thereof benzotriazole-based, triazine-based, benzophenone-based, and benzoate-based ultraviolet absorbers. Examples of the ultraviolet absorber include, but are not limited to, benzotriazole-based ultraviolet absorbers such as 2,4-di-tert-butyl-6-(5-chlorobenzotriazole-2-yl)phenol, 2-(2H-benzotriazole-2-yl)-4,6-di-tert-pentylphenol, 2-(2H-benzotriazole-2-yl)-4-(1,1,3,3-tetramethylbutyl)phenol, a reaction product of methyl 3-(3-(2H-benzotriazole-2-yl)-5-tert-butyl-4-hydroxyphenyl)propionate/polyethyl ene glycol 300; triazol-based ultraviolet absorbers such as 2-(2H-benzotriazole-2-yl)-6-(linear and branched dodecyl)-4-methylphenol; triazine-based ultraviolet absorbers such as 2-(4,6-diphenyl-1,3,5-triazine-2-yl)-5-[(hexyl)oxy]-phenol; benzophenone-based ultraviolet absorbers such as octabenzone; and benzoate-based ultraviolet absorbers such as 2,4-di-tert-butylphenyl-3,5-di-tert-butyl-4-hydroxybenzoate. These ultraviolet absorbers can be used singly or in combination of two or more of them.

A second embodiment of the curable composition of the present invention includes the crosslinkable silyl group-containing organic polymer (A) and the organotin compound (C1) represented by the following general formula (5):

[Formula 5]

$$R^9R^{10}SnO \qquad (5)$$

(wherein $R^9$ and $R^{10}$ each represent a monovalent hydrocarbon group.)

The component (A) is the same as that described above with reference to the first embodiment of the curable composition of the present invention. It is to be noted that the crosslinkable silyl group-containing (meth)acrylic polymer (B) as disclosed in Patent Document 1 may be used as the component (A). The component (C1) is also the same as that described above with reference to the first embodiment of the curable composition of the present invention, and the component (C1) is blended in the same ratio as described above with reference to the first embodiment of the curable composition of the present invention. The same materials as described above with reference to the first embodiment other than the above components can also be blended with the curable composition.

The curable composition of the present invention is not particularly limited, but is preferably produced by the production method of the present invention from the viewpoint of the acceleration of development of curing properties. According to the production method of the curable composition of the present invention, the curable composition containing at least the polymer (A) and the organotin compound (C1) as a curing catalyst is packed in a hermetically sealed container, and is then subjected to reaction treatment to develop quick curability.

The reaction treatment to develop quick curability is not particularly limited. For example, the curable composition may be preserved at a low temperature to room temperature until quick curing curability is developed, or may be subjected to heat treatment. The heat treatment is preferably carried out at 30 to 150° C. for 30 minutes to 3 days. The curable composition of the present invention using the organotin compound (C1) as the curing catalyst (C) has high production stability and is gradually cured. Generally, the curable composition of the present invention exhibits its inherent quick curability after storage at room temperature in about one month, but the development of curing properties can be significantly accelerated by the heat treatment. The heat treatment is appropriately carried out depending on the situation.

EXAMPLE

Hereinafter, the present invention will be described in more detail with reference to the following Examples. However, it goes without saying that these Examples are illustrative only and not intended to limit the present invention.

Synthesis Example 1

43 parts by weight of xylene, 80 parts by weight of methylmethacrylate, 20 parts by weight of stearylmethacrylate, 20 parts by weight of γ-methacryloxypropyltrimethoxysilane, and 0.1 parts by weight of ruthenocene dichloride as a metal catalyst were placed in a flask equipped with a stirrer, a nitrogen gas introduction tube, a thermometer, and a reflux cooling tube. The flask contents were heated to 80° C. while a nitrogen gas was being introduced into the flask.

Then, 20 parts by weight of 3-mercaptopropyltrimethoxysilane sufficiently purged with a nitrogen gas was fed into the flask at once under stirring. After the completion of addition of 20 parts by weight of the 3-mercaptopropyltrimethoxysilane, the flask contents under stirring were heated or cooled for 4 hours so that the temperature of the flask contents was maintained at 80° C. Further, another 20 parts by weight of 3-mercaptopropyltrimethoxysilane sufficiently purged with a nitrogen gas was fed into the flask in 5 minutes under stirring. After the completion of addition of another 20 parts by weight of the 3-mercaptopropyltrimethoxysilane, reaction was carried out for 4 hours while the flask contents were cooled and heated so that the temperature of the flask contents under stirring was maintained at 90° C.

After the completion of the reaction carried out in the above manner for 8 hours and 5 minutes in total, an obtained reaction product was cooled to room temperature, and then 20 parts by weight of a benzoquinone solution (95% THF solution) was added to the reaction product to terminate polymerization. Further, as the crosslinkable silyl group-containing organic polymer (A), 150 parts by weight of Silyl SAT-200 manufactured by KANEKA CORPORATION (crosslinkable silyl group-containing polyoxyalkylene-based polymer; crosslinkable silyl group: methyldimethoxysilyl group) was added to the reaction product.

The thus obtained reaction product was transferred into an evaporator, and was gradually heated to 80° C. under a reduced pressure to remove xylene, THF, and the remaining monomers and thiol compound. As a result, a mixture 1 of a crosslinkable silyl group-containing polyoxyalkylene-based polymer (A) and a (meth)acrylic polymer (B) was obtained.

Synthesis Example 2

Synthesis was carried out in the same manner as in Synthesis Example 1 except that 10 parts by weight of normal butyl acrylate and 70 parts by weight of methylmethacrylate were placed in the flask instead of 80 parts by weight of methylmethacrylate. As a result, a mixture 2 of a crosslinkable silyl group-containing polyoxyalkylene-based polymer (A) and a (meth)acrylic polymer (B) was obtained.

Synthesis Example 3

Synthesis was carried out in the same manner as in Synthesis Example 1 except that 10 parts by weight of normal butyl acrylate, 70 parts by weight of methylacrylate, and 20 parts by weight of stearylacrylate were placed in the flask instead of 43 parts by weight of xylene, 80 parts by weight of methylmethacrylate, and 20 parts by weight of stearylmethacrylate. As a result, a mixture 3 of a crosslinkable silyl group-containing polyoxyalkylene-based polymer (A) and a (meth)acrylic polymer (B) was obtained.

Synthesis Example 4

Synthesis was carried out in the same manner as in Synthesis Example 3 except that 150 parts by weight of ES-GX3440ST manufactured by ASAHI GLASS Co., Ltd. (crosslinkable silyl group-containing polyoxyalkylene-based polymer; crosslinkable silyl group: trimethoxysilyl group) was fed into the flask as a crosslinkable silyl group-containing organic polymer (A) instead of 150 parts by weight of Silyl SAT-200 (crosslinkable silyl group: methyldimethoxysilyl group). As a result, a mixture 4 of a crosslinkable silyl group-containing polyoxyalkylene-based polymer (A) and a (meth) acrylic polymer (B) was obtained.

Synthesis Example 5

Synthesis was carried out in the same manner as in Synthesis Example 3 except that 75 parts by weight of Silyl SAT-200 (crosslinkable silyl group: methyldimethoxysilyl group) and 75 parts by weight of ES-GX3440ST (crosslinkable silyl group: trimethoxysilyl group) were fed into the flask as a crosslinkable silyl group-containing organic polymer (A) instead of 150 parts by weight of Silyl SAT-200 (crosslinkable silyl group: methyldimethoxysilyl group). As a result, a mixture 5 of a crosslinkable silyl group-containing polyoxyalkylene-based polymer (A) and a (meth)acrylic polymer (B) was obtained.

Synthesis Example 6

Synthesis was carried out in the same manner as in Synthesis Example 3 except that 150 parts by weight of Silyl MA-440 manufactured by KANEKA CORPORATION (crosslinkable silyl group-containing (meth)acrylic-modified polyoxyalkylene-based polymer; crosslinkable silyl group: methyldimethoxysilyl group) was fed into the flask as a crosslinkable silyl group-containing organic polymer (A) instead of 150 parts by weight of Silyl SAT-200 (crosslinkable silyl group: methyldimethoxysilyl group). As a result, a mixture 6 of a crosslinkable silyl group-containing (meth)acrylic-modified polyoxyalkylene-based polymer (A) and a (meth)acrylic polymer (B) was obtained.

Comparative Synthesis Example 1

43 parts by weight of xylene, 80 parts by weight of methylmethacrylate, parts by weight of stearylmethacrylate, 20 parts by weight of γ-methacryloxypropyltrimethoxysilane, and 0.1 part by weight of ruthenocene dichloride as a metal catalyst were placed in a flask equipped with a stirrer, a nitrogen gas introduction tube, a thermometer, and a reflux cooling tube. The flask contents were heated to 80° C. while a nitrogen gas was introduced into the flask.

Then, 20 parts by weight of 3-mercaptopropyltrimethoxysilane sufficiently purged with a nitrogen gas was fed into the flask at once under stirring. After the completion of addition of 20 parts by weight of the 3-mercaptopropyltrimethoxysilane, the flask contents under stirring were heated or cooled for 4 hours so that the temperature of the flask contents was maintained at 80° C. Further, another 20 parts by weight of 3-mercaptopropyltrimethoxysilane sufficiently purged with a nitrogen gas was fed into the flask for 5 minutes under stirring. After the completion of addition of another 20 parts by weight of the 3-mercaptopropyltrimethoxysilane, reaction was carried out for 4 hours while the flask contents were cooled or heated so that the temperature of the flask contents under stirring was maintained at 90° C.

After the completion of the reaction carried out in the above manner for 8 hours and 5 minutes in total, an obtained reaction product was cooled to room temperature, and then 20 parts by weight of a benzoquinone solution (95% THF solution) was added to the reaction product to terminate polymerization.

The thus obtained reaction product was transferred into an evaporator, and was gradually heated to 80° C. under a reduced pressure to remove THF and the remaining monomers and thiol compound. As a result, a (meth)acrylic polymer 1(B) was obtained.

Comparative Synthesis Example 2

Synthesis was carried out in the same manner as in Comparative Synthesis Example 1 except that 10 parts by weight of normal butyl acrylate and 70 parts by weight of methylmethacrylate were placed in the flask instead of 80 parts by weight of methylmethacrylate. As a result, a (meth)acrylic polymer 2(B) was obtained.

Comparative Synthesis Example 3

Synthesis was carried out in the same manner as in Comparative Synthesis Example 1 except that 10 parts by weight of normal butyl acrylate, 70 parts by weight of methylacrylate, and 20 parts by weight of stearylacrylate were placed in the flask instead of 43 parts by weight of xylene, 80 parts by weight of methylmethacrylate, and 20 parts by weight of stearylmethacrylate. As a result, a (meth)acrylic polymer 3(B) was obtained.

Comparative Synthesis Example 4

45 parts by weight of xylene heated to 110° C., 80 parts by weight of methylmethacrylate, 20 parts by weight of stearylmethacrylate, 2.5 parts by weight of γ-methacryloxypropyltrimethoxysilane, and 2.1 parts by weight of 3-mercaptopropyltrimethoxysilane were placed in a flask, and then a solution in which 7.4 parts by weight of azobisisobutyronitrile was dissolved was dropped as a polymerization initiator into the flask for 6 hours. After 2 hours passed from the completion of dropping of the solution, polymerization was carried out, and 150 parts by weight of Silyl SAT-200 (crosslinkable silyl group: methyldimethoxysilyl group) was added thereto as a crosslinkable silyl group-containing polyoxyalkylene-based polymer (A).

The thus obtained reaction product was transferred into an evaporator, and was then gradually heated to 80° C. under a reduced pressure to remove xylene and the remaining monomers thereby to obtain a mixture 7 of the crosslinkable silyl group-containing polyoxyalkylene-based polymer (A) and a (meth)acrylic polymer.

Example 1

As shown in Table 1, the mixture 1 of a crosslinkable silyl group-containing polyoxyalkylene polymer (A) and a crosslinkable silyl group-containing (meth)acrylic polymer (B) obtained in Synthesis Example 1, vinyltrimethoxysilane, an aminosilane compound, and No. 918 (that is a reaction product of dibutyltin oxide with phthalate) as a curing catalyst (C) were blended in their respective predetermined amounts shown in Table 1 to prepare a curable composition.

crosslinkable silyl group-containing (meth)acrylic polymer (B: 100 parts by weight) obtained in Synthesis Example 1;

*2: the mixture 2 of crosslinkable silyl group-containing polyoxyalkylene polymer (A) and crosslinkable silyl group-containing (meth)acrylic polymer (B) obtained in Synthesis Example 2;

*3: the mixture 3 of crosslinkable silyl group-containing polyoxyalkylene polymer (A: 150 parts by weight) and crosslinkable silyl group-containing (meth)acrylic polymer (B: 100 parts by weight) obtained in Synthesis Example 3;

*4: the mixture 4 of crosslinkable silyl group-containing polyoxyalkylene polymer (A: 150 parts by weight) and crosslinkable silyl group-containing (meth)acrylic polymer (B: 100 parts by weight) obtained in Synthesis Example 4;

*5: the mixture 5 of crosslinkable silyl group-containing polyoxyalkylene polymer (A: 150 parts by weight) and crosslinkable silyl group-containing (meth)acrylic polymer (B: 100 parts by weight) obtained in Synthesis Example 5;

*6: the mixture 6 of crosslinkable silyl group-containing polyoxyalkylene polymer (A: 150 parts by weight) and crosslinkable silyl group-containing (meth)acrylic polymer (B: 100 parts by weight) obtained in Synthesis Example 6;

*7: the crosslinkable silyl group-containing (meth)acrylic polymer (B) obtained in Comparative Synthesis Example 1;

*8: the crosslinkable silyl group-containing (meth)acrylic polymer (B) obtained in Comparative Synthesis Example 2;

*9: the crosslinkable silyl group-containing (meth)acrylic polymer (B) obtained in Comparative Synthesis Example 3;

*10: reaction product of dibutyltin oxide with phthalate manufactured by Sankyo Organic Chemicals Co., Ltd. under the trade name of No. 918;

*11: dibutyltin oxide manufactured by Nitto Kasei Co., Ltd. under the trade name of Neostan U-300; and

*12: N-β(aminoethyl)γ-aminopropyltrimethoxysilane.

TABLE 1

|  | Examples | | | | | | | Comparative Examples | | |
|---|---|---|---|---|---|---|---|---|---|---|
|  | 1 | 2 | 3 | 4 | 5 | 6 | 7 | 1 | 2 | 3 |
| Mixture 1 (A) + (B)*1 | 100 | — | — | — | — | — | 100 | — | — | — |
| Mixture 2 (A) + (B)*2 | — | 100 | — | — | — | — | — | — | — | — |
| Mixture 3 (A) + (B)*3 | — | — | 100 | — | — | — | — | — | — | — |
| Mixture 4 (A) + (B)*4 | — | — | — | 100 | — | — | — | — | — | — |
| Mixture 5 (A) + (B)*5 | — | — | — | — | 100 | — | — | — | — | — |
| Mixture 6 (A) + (B)*6 | — | — | — | — | — | 100 | — | — | — | — |
| (Meth)acrylic polymer 1(B)*7 | — | — | — | — | — | — | — | 143 | — | — |
| (Meth)acrylic polymer 2(B)*8 | — | — | — | — | — | — | — | — | 143 | — |
| (Meth)acrylic polymer 3(B)*9 | — | — | — | — | — | — | — | — | — | 100 |
| No. 918 (C)*10 | 2 | 2 | 2 | 2 | 2 | 2 | — | 2 | 2 | 2 |
| Neostan U-300 (C1)*11 | — | — | — | — | — | — | 2 | — | — | — |
| Aminosilane compound (D)*12 | 3 | 3 | 3 | 3 | 3 | 3 | 3 | 3 | 3 | 3 |
| Vinyltrimethoxysilane | 2 | 2 | 2 | 2 | 2 | 2 | 2 | 2 | 2 | 2 |

In Table 1, the amount of each of the materials to be blended is expressed in terms of part by weight, and the marks *1 to *12 indicate the following:

*1: the mixture 1 of crosslinkable silyl group-containing polyoxyalkylene polymer (A: 150 parts by weight) and Examples 2 to 6

In each of Examples 2 to 6, a curable composition was prepared, as in Example 1, by blending the materials shown in Table 1 in the blending ratio shown in Table 1.

Example 7

A curable composition was prepared in the same manner as in Example 1 except that Neostan U-300 (dibutyltin oxide) was used in a predetermined amount shown in Table 1 as the component (C) instead of No. 918 (that is a reaction product of dibutyltin oxide with phthalate). The resultant curable composition was hermetically charged into a cartridge coated with aluminum, and was then subjected to heat curing at 50° C. for 3 days. Thereafter, an experiment was conducted as in Example 1.

Comparative Examples 1 to 3

In each of Comparative Examples 1 to 3, a curable composition was prepared, as in Example 1, by blending the materials shown in Table 1 in the blending ratio shown in Table 1.

For each of these curable compositions obtained in Examples 1 to 7 and Comparative Examples 1 to 3, the following measurements were carried out, and measurement results are shown in Table 2.

1. Adhesion Properties

Adhesion properties were determined by a method for testing tensile shear strength of rigid adherebds in accordance with JIS K 6850. As the adherends, an alumite plate and a hemlock plate were used. Failure conditions were evaluated according to two criteria. Specifically, in Table 2, "○" represents cohesive failure and "×" represents interfacial failure.

2. Rubber-Like Properties

Rubber-like properties were determined by a tensile testing method for vulcanized rubber in accordance with JIS K 6521 using a dumbbell-shaped test piece No. 3. In Table 2, "×" indicates that measurement was impossible.

3. Deep-Part Curability

A container having a diameter of 4 cm or larger and a height of 2 cm or higher and allowing moisture to pass through in only one direction was filled with the curable composition adjusted at 23° C., and then the surface curable composition was leveled so as to be flat. The container was left under the conditions of 50% RH at 23° C. for 24 hours, and then the thickness of a cured portion was measured with a dial gauge.

4. Storage Stability

The viscosity of each of the curable compositions measured with a B-type viscometer manufactured by Toki Sangyo Co., Ltd. (BS rotor No. 7; 10 rpm) after being left under the conditions of 50% RH at 23° C. for 24 hours was defined as an initial viscosity. Then, such a curable composition was further left in a drier at 50° C. for 2 weeks, and was then left under the conditions of 50% RH at 23° C. for 24 hours. Thereafter, the liquid temperature of the curable composition was adjusted to 23° C. to again measure the viscosity thereof with the same B-type viscometer as described above. The thus measured viscosity was defined as a viscosity after storage. The storage stability was evaluated in terms of the value calculated from the formula: viscosity after storage/initial viscosity. In Table 2, "○" indicates that the value was less than 1.3, and "×" indicates that the value was 1.3 or more.

5. Tack Free Drying Time

Tack free drying time was measured according to JIS A 1439 4.19. In Table 2, "○" indicates that the tack free drying time was less than 10 minutes, and "×" indicates that the tack free drying time was 10 minutes or longer.

TABLE 2

|  |  | Examples | | | | | | | Comparative Examples | | |
|---|---|---|---|---|---|---|---|---|---|---|---|
|  |  | 1 | 2 | 3 | 4 | 5 | 6 | 7 | 1 | 2 | 3 |
| Adhesion properties | Final strength (N/mm$^2$) | 3.1 | 2.7 | 2.1 | 2.1 | 2.2 | 2.7 | 3.2 | 2.6 | 2.4 | 1.6 |
|  | Failure conditions | ○ | ○ | ○ | ○ | ○ | ○ | ○ | × | × | × |
| Rubber-like properties | Final strength (N/mm$^2$) | 4.1 | 3.7 | 1.5 | 1.5 | 1.6 | 3.8 | 4.2 | × | × | × |
|  | Elongation (%) | 125 | 130 | 110 | 110 | 120 | 90 | 130 | × | × | × |
| Deep-part curability (mm) | | 1.6 | 1.7 | 1.7 | 1.5 | 1.5 | 1.3 | 1.5 | 0.7 | 0.9 | 0.9 |
| Storage stability | | ○ | ○ | ○ | ○ | ○ | ○ | ○ | ○ | ○ | ○ |
| Tack free drying time | | ○ | ○ | ○ | ○ | ○ | ○ | ○ | ○ | ○ | ○ |

As shown in Table 2, the curable compositions of Examples 1 to 7 were excellent in adhesion properties, rubber-like properties, deep-part curability, and storage stability. On the other hand, the curable compositions of Comparative Examples 1 to 3 which did not contain the component (A) were poor in adhesion properties and rubber-like properties. In addition, the curable compositions of Comparative Examples 1 to 3 were inferior in deep-part curability to the curable compositions of Examples 1 to 7.

Example 8

The mixture 1 of a crosslinkable silyl group-containing polyoxyalkylene polymer (A) and a crosslinkable silyl group-containing (meth)acrylic polymer (B) obtained in Synthesis Example 1, a filler, and vinyltrimethoxysilane were blended in their respective predetermined amounts shown in Table 3, and were then heated at 110° C. under a reduced pressure while being stirred for 2 hours to remove water from the mixture. Further, an aminosilane compound and No. 918 (that is a reaction product of dibutyltin oxide with phthalate) were added thereto in their respective predetermined amounts to prepare a curable composition.

TABLE 3

|  | Example 8 | Example 9 | Comparative Example 4 |
|---|---|---|---|
| Mixture 1 (A) + (B)*1 | 100 | — | — |
| Mixture 4 (A) + (B)*4 | — | 100 | — |
| Mixture 7 (A)*13 | — | — | 100 |
| No. 918 (C)*10 | 2 | 2 | 2 |

TABLE 3-continued

|  | Example 8 | Example 9 | Comparative Example 4 |
|---|---|---|---|
| Aminosilane compound (D)*12 | 3 | 3 | 3 |
| Filler*14 | 40 | 40 | 40 |
| Vinyltrimethoxysilane | 2 | 2 | 2 |

In Table 3, the amount of each of the materials to be blended is expressed in terms of part by weight, the marks *1, *4, *10 and *12 have the same meanings as described above with reference to Table 1, and the marks *13 and *14 indicate the following:

*13: the mixture of crosslinkable silyl group-containing polyoxyalkylene polymer (A: 150 parts by weight) and crosslinkable silyl group-containing (meth)acrylic polymer (100 parts by weight) obtained in Comparative Synthesis Example 4; and

*14: calcium carbonate treated with fatty acid (manufactured by Maruo Calcium Co., Ltd. under the trade name of "Calfine 200M").

Example 9 and Comparative Example 4

In each of Example 9 and Comparative Example 4, a curable composition was prepared, as in Example 1, by blending the materials shown in Table 3 in the blending ratio shown in Table 3.

For these curable compositions of Examples 8 and 9 and Comparative Example 4, measurements were carried out to determine adhesion properties, storage stability, and tack free drying time. Adhesion properties were determined by a method for testing tensile shear strength of rigid adherebds in accordance with JIS K 6850 using various adherends shown in Table 4. Storage stability and tack free drying time were determined in the same manner as in Example 1. The measurement results are shown in Table 4.

TABLE 4

|  |  | Example 8 | Example 9 | Comparative Example 4 |
|---|---|---|---|---|
| Adhesion properties | Alumite | 4.1 | 4.0 | 3.2 |
|  | Acryl | 4.0 | 4.1 | 3.0 |
|  | Polycarbonate | 4.1 | 4.1 | 3.1 |
|  | Polystyrene | 2.9 | 2.8 | 2.5 |
|  | ABS | 3.5 | 3.7 | 2.8 |
| Storage stability |  | ○ | ○ | ○ |
| Tack free drying time (min) |  | <10 | <10 | 15 |

As shown in Table 4, the curable compositions of Examples 8 and 9 were excellent in adhesion properties and adhesive strength. On the other hand, the curable composition of Comparative Example 4 was inferior in adhesive strength to the curable compositions of Examples 8 and 9.

Synthesis Example 7

Polymerization of propylene oxide was carried out using glycerol as an initiator and zinc hexacyanocobaltate as a catalyst to obtain polyoxypropylenetriol. To the polyoxypropylenetriol, isocyanatepropyltrimethoxysilane was added to carry out a urethanization reaction, to thereby obtain a trimethoxysilyl-terminated polymer P1 having a molecular weight of 18,000.

Synthesis Example 8

Isocyanatepropyltrimethoxysilane was added to UH2000 manufactured by TOAGOSEI Co., Ltd. (molecular weight: 11,000; viscosity: 14,000 mPa·S/25° C.; Tg: −55° C./DSC; OHV: 20 mg-KOH/g-resin) to carry out a urethanization reaction, to thereby obtain a trimethoxysilyl-terminated polymer P2.

Example 10

The crosslinkable silyl group-containing organic polymer (A), an antioxidant, calcium carbonate, and vinyltrimethoxysilane were blended in their respective predetermined amounts shown in Table 5, and were then heated at 110° C. under a reduced pressure while being stirred with a multi-purpose mixer (manufactured by Shinagawa Machinery Works Co., Ltd.) for 2 hours to remove water from the mixture. Further, an aminosilane compound (D) and dibutyltin oxide (C1) were added thereto, and the mixture was stirred with a multi-purpose mixer (manufactured by Shinagawa Machinery Works Co., Ltd.) under a reduced pressure for 10 minutes to prepare a curable composition. The curable composition was hermetically charged into an aluminum-coated cartridge.

TABLE 5

|  | Examples | | | | | Comparative Examples | |
|---|---|---|---|---|---|---|---|
|  | 10 | 11 | 12 | 13 | 14 | 5 | 6 |
| Polymer P1 (A)*15 | 100 | — | 50 | — | 100 | 100 | 100 |
| Polymer P2 (A)*16 | — | 100 | — | — | — | — | — |
| SAT-200 (A)*17 | — | — | 50 | 100 | — | — | — |
| STANN BO (C1)*18 | 2 | 2 | 2 | 2 | — | — | — |
| Neostan U-800 (C1)*19 | — | — | — | — | 3 | — | — |
| No. 918 (C)*10 | — | — | — | — | — | 4 | — |
| Neostan U-220 (C)*20 | — | — | — | — | — | — | 4 |
| Animosilane compound (D)*12 | 2 | 2 | 2 | 2 | 2 | 2 | 2 |
| Antioxidant*21 | 3 | 3 | 3 | 3 | 3 | 3 | 3 |
| Filler*14 | 70 | 70 | 70 | 70 | 70 | 70 | 70 |
| Vinyltrimethoxysilane | 2 | 2 | 2 | 2 | 2 | 2 | 2 |

In Table 5, the amount of each of the materials to be blended is expressed in terms of gram, the marks *10, *12, and *14 have the same meaning as described above with reference to Tables 1 and 3, and the marks *15 to *21 indicate the following:

*15: the polymer P1 produced in Synthesis Example 7;

*16: the polymer P2 produced in Synthesis Example 8;

*17: crosslinkable silyl group-containing polyoxyalkylene polymer (manufactured by KANEKA CORPORATION under the trade name of SAT-200 and having a difunctional crosslinkable silyl group);

*18: dibutyltin oxide (manufactured by Sankyo Organic Chemicals Co., Ltd. under the trade name of "STANN BO");

*19: dioctyltin oxide (manufactured by Nitto Kasei Co., Ltd. under the trade name of "Neostan U-800");

*20: dibutyltin diacetylacetonate (manufactured by Nitto Kasei Co., Ltd. under the trade name of "Neostan U-220"); and

*21: "Tinuvin B75" (trade name) manufactured by Ciba Specialty Chemicals Corp.

Examples 11 to 14 and Comparative Examples 5 and 6

In each of Examples 11 to 14 and Comparative Examples 5 and 6, a curable composition was prepared in the same manner as in Example 10 except that the materials to be blended and the blending ratio were changed as shown in Table 5.

The following performance tests were carried out on these curable compositions of Examples 11 to 14 and Comparative Examples 5 and 6.

(1) Tack Free Drying Time

An experiment was carried out to check whether the tack free drying time of each of the curable compositions of Example 10 and Comparative Example 5 was changed by treatment at 20° C., 50° C. or 80° C. for a predetermined time after production. The tack free drying time was measured according to JIS A 1439 4.19. The measurement results are shown in FIG. 1

As shown in FIG. 1, the tack free drying time of the curable composition of Example 10 was changed according to the conditions of treatment carried out after production, such as temperature and elapsed time, but the tack free drying time of the curable composition of Comparative Example 5 was constant irrespective of the changes of temperature and elapsed time.

The tack free drying time of each of the curable compositions of Examples 10 to 14 and Comparative Examples 5 and 6 was measured just after production and after reaction treatment carried out under the conditions shown in Table 6. The measurement results are shown in Tables 6 and 7 (Table 7 shows only the results measured after reaction treatment was carried out).

TABLE 6

| | Examples | | | | | Comparative Examples | |
|---|---|---|---|---|---|---|---|
| | 10 | 11 | 12 | 13 | 14 | 5 | 6 |
| Just after production (min) | 480 | 460 | 720 | 1440 | 1200 | 5 | 5 |
| 20° C. 14 days (min) | 5 | 5 | 15 | 30 | 20 | 5 | 5 |
| 50° C. 3 days (min) | 5 | 5 | 15 | 30 | 20 | 5 | 5 |
| 80° C. 1 day (min) | 5 | 5 | 15 | 30 | 20 | 5 | 5 |

(2) Production Stability

The production stability of the curable composition was evaluated according to tack free drying time measured just after production. The results are shown in Table 7. In Table 7, "○" indicates that the tack free drying time was 30 minutes or longer, and "×" indicates that the tack free drying time was less than 30 minutes.

(3) Product Stability

The curable compositions of Examples 10 to 14 subjected to reaction treatment at 50° C. for 3 days were prepared, and the curable compositions of Comparative Examples 5 and 6 just after production were prepared. The viscosity of each of such curable compositions measured with a B-type viscometer manufactured by Toki Sangyo Co., Ltd. (BS rotor No. 7, 10 rpm) after being left under the conditions of 50% RH at 23° C. for 24 hours was defined as an initial viscosity. Then, such a curable composition was further left in a drier at 50° C. for 2 weeks, and was then left under the conditions of 50% RH at 23° C. for 24 hours. Thereafter, the liquid temperature of the curable composition was adjusted to 23° C. to again measure the viscosity thereof with a B-type viscometer manufactured by Toki Sangyo Co., Ltd. (BS rotor No. 7, 10 rpm), and the viscosity was defined as a viscosity after storage. The storage stability was evaluated in terms of a value calculated from the formula: viscosity after storage/initial viscosity. The evaluation results are shown in Table 7. In Table 7, " " indicates that the value was less than 1.3, and "×" indicates that the value was 1.3 or more.

(4) Adhesion Properties

The curable compositions of Examples 10 to 14 subjected to reaction treatment at 50° C. for 3 days were prepared, and the curable compositions of Comparative Examples 5 and 6 just after production were prepared. Each of such curable compositions was applied onto an alumite adherend in such a manner that the width, length, and height were 30 mm, 50 mm, and 5 mm, respectively, and was then cured at 23° C. at 50% RH for 14 days to prepare a test piece. After the completion of curing, an incision was made at the end portion of the test piece with a cutter, and then the curable composition was peeled off from the adherend with hands. The test results are shown in Table 7. In table 7, " " indicates cohesive failure and "×" indicates interfacial failure.

TABLE 7

| | Examples | | | | | Comparative Examples | |
|---|---|---|---|---|---|---|---|
| | 10 | 11 | 12 | 13 | 14 | 5 | 6 |
| Production stability | ○ | ○ | ○ | ○ | ○ | × | × |
| Tack free drying time (min) | 5 | 5 | 15 | 30 | 20 | 5 | 5 |
| Product stability | ○ | ○ | ○ | ○ | ○ | × | × |
| Adhesion properties | ○ | ○ | ○ | ○ | ○ | ○ | ○ |

As shown in Tables 6 and 7, the curable compositions of Examples 10 and 14 were excellent in production stability, quick curability, product stability and adhesion properties, but the curable compositions of Comparative Example 5 and 6 had problems in production stability and product stability.

INDUSTRIAL APPLICABILITY

The curable composition of the present invention may be used as a one-component curable composition or a two-component curable composition if necessary, but is preferably used as a one-component curable composition. The curable composition of the present invention is preferably used as, for example, sealants, adhesives, pressure-sensitive adhesives, coating materials, and potting materials. Among them, the curable composition of the present invention is particularly preferably used as adhesives. In addition, the curable composition of the present invention can also be used for various purposes such as architecture, cars, civil engineering, and electrical and electronic fields.

The invention claimed is:

1. A method for producing a curable composition, the method comprising:
   polymerizing (A) a crosslinkable silyl group-containing organic polymer, wherein the polymer (A) is at least one selected from the group consisting of a crosslinkable silyl group-containing polyoxyalkylene polymer, a crosslinkable silyl group-containing (meth)acrylic-modified polyoxyalkylene polymer, a crosslinkable silyl group-containing polyisobutylene polymer, and a first crosslinkable silyl group-containing (meth)acrylic polymer;
   preparing (B) a second (meth)acrylic polymer obtained by polymerizing a (meth)acrylic monomer having a polymerizable unsaturated bond in the presence of a metallocene compound represented by the following formula (1) and a crosslinkable silyl group-containing thiol compound, at least one end of the (meth)acrylic polymer being bonded to a residue, —S—R3 (where R3 represents a group having a crosslinkable silyl group)

obtained by removing a hydrogen atom from the crosslinkable silyl group-containing thiol compound; and blending said polymer (A) and said second (meth)acrylic polymer (B):

[Formula 1]

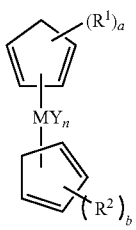

(1)

wherein M represents a metal selected from the group consisting of metals of Groups 4, 5, and 14 of the periodic table, chromium, ruthenium, and palladium; $R^1$ and $R^2$ each independently represent at least one group selected from the group consisting of substituted or unsubstituted aliphatic hydrocarbon groups, substituted or unsubstituted alicyclic hydrocarbon groups, substituted or unsubstituted aromatic hydrocarbon groups, and substituted or unsubstituted silicon-containing groups, a hydrogen atom or a single bond, $R^1$ and $R^2$ may cooperate with each other to bond the two five-membered rings of the compound represented by the formula (1) and the plurality of adjacent groups $R^1$ or $R^2$ may cooperate with each other to form a cyclic structure; a and b each independently represent an integer of 1 to 4; Y represents a halogen atom or a hydrocarbon group in which at least part of hydrogen atoms may be substituted with a halogen atom; and n is 0 or an integer obtained by subtracting 2 from the valence of the metal M.

2. The method according to claim 1, wherein the main chain of the second (meth)acrylic polymer (B) contains a repeating unit represented by the following formula (2) in an amount of 99% by weight or less, and wherein the main chain of the (meth)acrylic polymer (B) further contains as a repeating unit other than the repeating unit represented by the formula (2), a repeating unit derived from a polymerizable unsaturated compound having at least one crosslinkable silyl group in the molecule in an amount of 1 to 50% by weight:

[Formula 2]

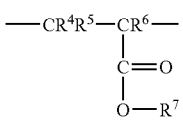

(2)

wherein $R^4$ to $R^6$ each independently represent a hydrogen atom, a halogen atom or an alkyl group having 1 to 3 carbon atoms, and $R^7$ represents a hydrogen atom, an alkali metal atom or a hydrocarbon group having 1 to 22 carbon atoms (the hydrocarbon group may be linear or may have a side chain; at least part of hydrogen atoms of the hydrocarbon group or of a group constituting the side chain of the hydrocarbon group may be substituted with at least one polar group or reactive functional group selected from the group consisting of a chlorine atom, a fluorine atom, a primary amino group, a secondary amino group, a tertiary amino group, a quaternary amine salt group, an amido group, an isocyanate group, an alkylene oxide group, a hydroxysilyl group, a methoxysilyl group, an ethoxysilyl group, a propoxysilyl group, a chlorosilyl group, a bromosilyl group, and a glycidyl group; the hydrocarbon group may have a double bond; and the hydrocarbon group may have a cyclic structure).

3. The method according to claim 1, wherein the crosslinkable silyl group of the second (meth)acrylic polymer (B) is represented by the following general formula (3):

[Formula 3]

 (3)

wherein X represents a hydroxyl or hydrolyzable group, and three Xs may be the same or different.

4. The method according to claim 1, wherein the second (meth)acrylic polymer (B) contains both of a crosslinkable silyl group represented by the following general formula (3) and a crosslinkable silyl group represented by the following general formula (4):

[Formula 3]

 (3)

[Formula 4]

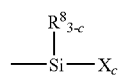 (4)

wherein X represents a hydroxyl or hydrolyzable group; when the plurality of Xs exist, they may be the same or different; $R^8$ represents a substituted or unsubstituted monovalent organic group having 1 to 20 carbon atoms; when the plurality of $R^8$s exist, they may be the same or different; and c is 1 or 2.

5. The method according to claim 1, wherein the second (meth)acrylic polymer (B) is a mixture of a (meth)acrylic polymer containing a crosslinkable silyl group represented by the following general formula (3) and a (meth)acrylic polymer containing a crosslinkable silyl group represented by the following general formula (4):

[Formula 3]

 (3)

[Formula 4]

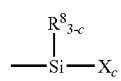 (4)

wherein X represents a hydroxyl or hydrolyzable group; when the plurality of Xs exist, they may be the same or different; $R^8$ represents a substituted or unsubstituted monovalent organic group having 1 to 20 carbon atoms; when the plurality of $R^8$s exist, they may be the same or different; and c is 1 or 2.

6. The method according to claim 1, wherein the curable composition further comprises a curing catalyst (C).

7. The method according to claim 6, wherein the curing catalyst (C) contains an organotin compound (C1) represented by the following general formula (5):

[Formula 5]

$$R^9R^{10}SnO \quad (5)$$

wherein $R^9$ and $R^{10}$ each represent a monovalent hydrocarbon group.

8. The method according to claim 1, wherein the polymer (A) is an organic polymer containing a crosslinkable silyl group represented by the following general formula (3):

[Formula 3]

$$-SiX_3 \quad (3)$$

wherein X represents a hydroxyl or hydrolyzable group, and three Xs may be the same or different.

9. The method according to claim 1, wherein the polymer (A) is an organic polymer containing both of a crosslinkable silyl group represented by the following general formula (3) and a crosslinkable silyl group represented by the following general formula (4):

[Formula 3]

$$-SiX_3 \quad (3)$$

[Formula 4]

$$-\underset{|}{Si}-X_c \quad (4)$$
$$\overset{R^8_{3-c}}{|}$$

wherein X represents a hydroxyl or hydrolyzable group; when the plurality of Xs exist, they may be the same or different; $R^8$ represents a substituted or unsubstituted monovalent organic group having 1 to 20 carbon atoms; when the plurality of $R^8$s exist, they may be the same or different; and c is 1 or 2.

10. The method according to claim 1, wherein the polymer (A) is a mixture of an organic polymer containing a crosslinkable silyl group represented by the following general formula (3) and an organic polymer containing a crosslinkable silyl group represented by the following general formula (4):

[Formula 3]

$$-SiX_3 \quad (3)$$

[Formula 4]

$$-\underset{|}{Si}-X_c \quad (4)$$
$$\overset{R^8_{3-c}}{|}$$

wherein X represents a hydroxyl or hydrolyzable group; when the plurality of Xs exist, they may be the same or different; $R^8$ represents a substituted or unsubstituted monovalent organic group having 1 to 20 carbon atoms; when the plurality of $R^8$s exist, they may be the same or different; and c is 1 or 2.

11. The method according to claim 1, wherein the curable composition further comprises a silane coupling agent (D).

* * * * *